(12) United States Patent
Collins

(10) Patent No.: US 10,877,278 B2
(45) Date of Patent: Dec. 29, 2020

(54) SYSTEMS AND METHODS FOR AUGMENTED REALITY DISPLAY

(71) Applicant: Tony Christopher Collins, Rosslyn, VA (US)

(72) Inventor: Tony Christopher Collins, Rosslyn, VA (US)

(*) Notice: Subject to any disclaimer, the term of this patent is extended or adjusted under 35 U.S.C. 154(b) by 95 days.

(21) Appl. No.: 16/409,696

(22) Filed: May 10, 2019

(65) Prior Publication Data

US 2019/0377186 A1 Dec. 12, 2019

Related U.S. Application Data

(60) Provisional application No. 62/683,258, filed on Jun. 11, 2018.

(51) Int. Cl.
*G02B 27/01* (2006.01)
*G02F 1/1335* (2006.01)

(52) U.S. Cl.
CPC ... *G02B 27/0172* (2013.01); *G02F 1/133528* (2013.01); *G02B 2027/012* (2013.01); *G02B 2027/014* (2013.01); *G02B 2027/0116* (2013.01); *G02B 2027/0127* (2013.01); *G02B 2027/0178* (2013.01); *G02F 2001/133531* (2013.01)

(58) Field of Classification Search
CPC .. G02B 27/0172; G02F 1/133528; G09G 3/36
See application file for complete search history.

(56) References Cited

U.S. PATENT DOCUMENTS

| | | | |
|---|---|---|---|
| 8,472,120 B2 | 6/2013 | Border et al. | |
| 8,970,960 B2 | 3/2015 | Yu | |
| 9,858,676 B2 | 1/2018 | Bostick et al. | |
| 9,874,749 B2 | 1/2018 | Bradski et al. | |
| 9,927,615 B2 | 3/2018 | Ma et al. | |
| 10,018,844 B2 | 7/2018 | Levola et al. | |
| 10,073,201 B2 | 9/2018 | Ma et al. | |
| 10,073,266 B2 | 9/2018 | Osterhout | |
| 2007/0064311 A1* | 3/2007 | Park | G02B 27/0172 359/630 |
| 2018/0239150 A1* | 8/2018 | Yoshida | G02B 6/005 |

OTHER PUBLICATIONS

Maimone et al., Pinlight Displays: Wide Field of View Augmented Reality Eyeglasses using Defocused Point Light Sources, ACM Transactions on Graphics, vol. 33, No. 4, Article 89, Jul. 2014 pp. 89:2-89:11.

* cited by examiner

*Primary Examiner* — Alexander Eisen
*Assistant Examiner* — Cory A Almeida
(74) *Attorney, Agent, or Firm* — Covington & Burling LLP

(57) ABSTRACT

An augmented reality system includes a power source, a sensor array including one or more sensors, a lens, a projector, and a first circuit. The first circuit can be powered by the power source and is capable of communicating with the sensor array and the projector. The first circuit can receive and process data collected by the sensor array to produce an augmented reality overlay. The lens can be configured to be in a first state wherein light is prevented from passing through a first portion of the lens, and the projector can project at least a first portion of the augmented reality overlay onto at least a second portion of the lens in the first state.

11 Claims, 18 Drawing Sheets

SYSTEMS AND METHODS FOR AUGMENTED REALITY DISPLAY

RELATED APPLICATIONS

This application claims priority under 35 U.S.C. § 119 to U.S. Provisional Application No. 62/683,258 filed on Jun. 11, 2018, the subject matter of which is hereby incorporated by reference.

BACKGROUND OF THE INVENTION

Current methods of displaying or projecting augmented reality images to a user have a number of technical limitations such as limited depth of field, limited field of view, and low resolution. Current methods also suffer from the "ghost effect," which refers to a phenomenon where virtual images appear transparent or translucent to the user. Furthermore, current systems are also typically bulky, socially awkward, and unfashionable.

BRIEF SUMMARY OF THE INVENTION

In some aspects and in some constructions, the present invention provides an augmented reality system including a power source, a sensor array including one or more sensors, a lens, a projector, and a first circuit. The first circuit can be powered by the power source and is capable of communicating with the sensor array and the projector. The first circuit can receive and process data collected by the sensor array to produce an augmented reality overlay. The lens can be configured to be in a first state wherein light is prevented from passing through a first portion of the lens, and the projector can project at least a first portion of the augmented reality overlay onto at least a second portion of the lens in the first state.

In some aspects and in some configurations, the augmented reality system can further include an eyewear frame. The power source, sensor array, lens, projector, and first circuit can be attached to the eyewear frame. The lens can be configured to be in a second state wherein light is not prevented from passing through the first portion of the lens. The first circuit can control the lens to be in the first state or the second state.

In some aspects and in some configurations, the augmented reality system can further include a headwear and an eyewear frame. The power source, sensor array, projector, and first circuit can be attached to the headwear. The lens and a second circuit can be attached to the eyewear frame. The lens can be configured to be in a second state wherein light is not prevented from passing through the first portion of the lens. The second circuit can control the lens to be in the first state or the second state.

In some aspects and in some configurations, the augmented reality system can further include an off board processor. The first circuit and the off board processor can use data collected by the sensor array to generate at least a second portion of the augmented reality overlay.

In some aspects and in some configurations, the lens can include a first conductive layer, a second conductive layer, and a liquid crystal layer disposed between the first and second conductive layers. The liquid crystal layer can include liquid crystals. The first conductive layer includes a plurality of first regions and a second region electrically isolated from the plurality of first regions. When the lens is in the first state, the liquid crystals disposed between the second region and the second conductive layer can be aligned.

In some aspects and in some configurations, the system can further include a first conductive layer, a second conductive layer, and a liquid crystal layer disposed between the first and second conductive layers. The liquid crystal layer can include liquid crystals. The first conductive layer can include a plurality of first regions and a plurality of second regions. The plurality of second regions can be electrically isolated from each other and from the plurality of first regions. When the lens is in the first state, the liquid crystals disposed between at least one of the plurality of second regions and the second conductive layer can be aligned. A third region can contain the second regions that are at least partially illuminated by the augmented reality overlay when the lens is in the first state, and when the lens is in the first state, the liquid crystals disposed between the third region and the second conductive layer can be aligned. A fourth region can contain at least one second region adjacent to the third region, and when the lens is in the first state, the liquid crystals disposed between the fourth region and the second conductive layer can be aligned. In some aspects and in some configurations, the lens is further controllable to a second state. The augmented reality overlay can be divided into a first augmented reality overlay portion and a second augmented reality overlay portion. In the first state, the projector can be configured to project the first augmented reality overlay portion onto the lens. In the second state, the projector can be configured to project the second augmented reality overlay portion onto the lens. A third region can contain the second regions that are at least partially illuminated by the first augmented reality overlay portion when the lens is in the first state. A fourth region can contain the second regions that are at least partially illuminated by the second augmented reality overlay portion when the lens is in the second state. In the first state; the liquid crystals disposed between the second conductive layer and the third region can be aligned. In the second state, the liquid crystals disposed between the second conductive layer and the fourth region can be aligned.

In some aspects and in some configurations, the lens can further include a first filter, a second filter, a first conductive layer and a second conductive layer both disposed between the first and second filters, a liquid crystal layer disposed between the first and second conductive layers, and a plurality of protrusions. The liquid crystal layer can include a region with liquid crystals and a plurality of regions without liquid crystals. The first filter can include a plurality of voids. Each of the plurality of protrusions can be approximately concentrically aligned with one of the plurality of regions without liquid crystals. In the first state, the liquid crystals disposed between the first conductive layer and the second conductive layer can be aligned. The second filter can also include a plurality of voids. Each of the plurality of voids of the second filter can be filled by one of the plurality of protrusions.

In some aspects and in some configurations, the lens can include a first conductive layer, a second conductive layer, and a liquid crystal layer disposed between the first and second conductive layers. The liquid crystal layer can include liquid crystals. The first conductive layer includes a plurality of multi-size first regions and a second region electrically isolated from the plurality of first regions. Each of the multi-size first regions can further include a first zone, a second zone, and a third zone, each of which are electrically isolated from each other. The lens can be further controllable to a second state, a third state, and an off state. In the first state, the liquid crystals disposed between the second conductive layer on one end and one of the second zones, one of the third zones, or the second region on the other end can be aligned. In the second state, the liquid crystals disposed between the second conductive layer on one end and one of the third zones or the second region on the other end can be aligned. In the third state, the liquid crystals disposed between the second conductive layer on one end and the second region on the other end can be aligned. The augmented reality system can be configured so that blue light passing through the lens in the first state, green light passing through the lens in the second state, and red light passing through the lens in the third state all diffract approximately the same amount.

In some aspects and in some constructions, the present invention provides a lens including a first filter and a second filter, a first conductive layer and a second conductive layer disposed between the first and second filters, and a liquid crystal layer disposed between the first and second conductive layers. The liquid crystal layer can include a plurality of liquid crystals. The first conductive layer can include a plurality of first regions and one or more second regions. The one or more second regions can be electrically isolated from each other and from the plurality of first regions. The plurality of first regions can be a plurality of multi-size first regions. Each of the plurality of multi-size first regions can further include a first zone, a second zone, and a third zone, each of which can be electrically isolated from each other.

In some aspects and in some constructions, the present invention provides a lens including a first filter, a second filter, a first conductive layer and second conductive layer both disposed between the first and second filters, a liquid crystal layer disposed between the first and second conductive layers, and a plurality of protrusions. The liquid crystal layer can include a region with liquid crystals and a plurality of regions without liquid crystals. The first filter can include a plurality of voids. Each of the plurality of voids can be filled by one of the plurality of protrusions. Each of the plurality of protrusions can be approximately concentrically aligned with one of the plurality of regions without liquid crystals. The second filter can also include a plurality of voids. Each of the plurality of voids of the second filter can be filled by one of the plurality of protrusions.

The figures are illustrative. For example, some of the elements in the figures may be emphasized relative to other elements to help to improve understanding of certain features.

DETAILED DESCRIPTION OF THE INVENTION

Figure 1:
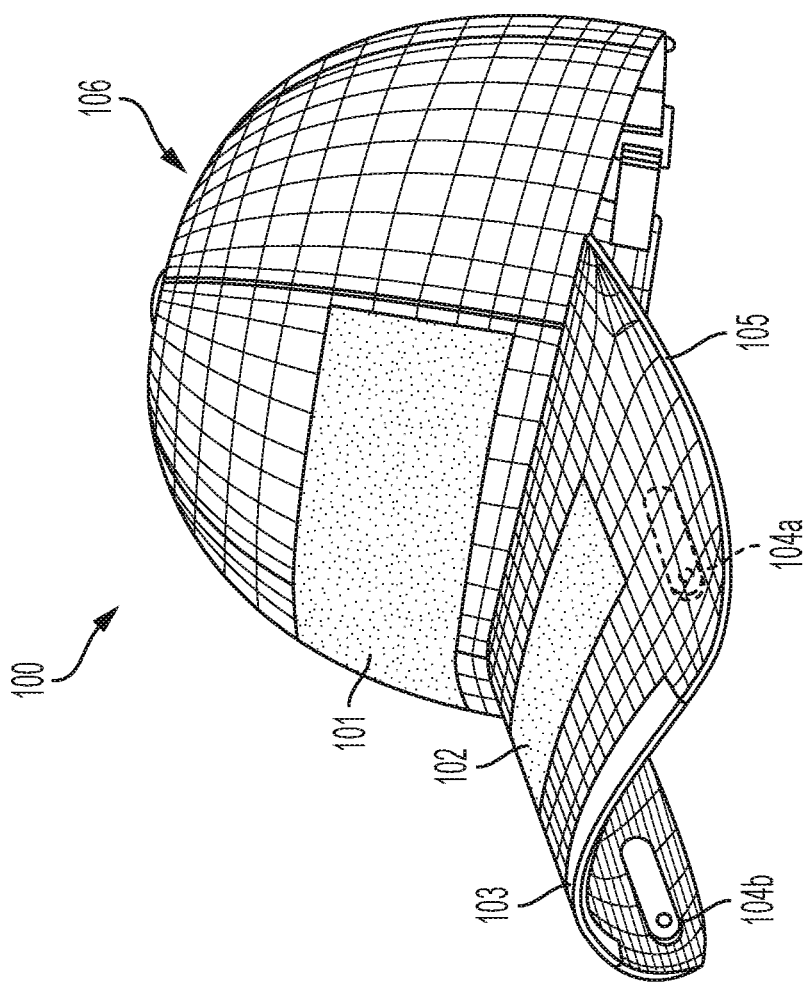
FIG. 1 is a perspective view of an embodiment of augmented reality (AR) headwear.

FIG. 1 is a perspective view of an embodiment of augmented reality (AR) headwear 100.

As shown in FIG. 1, headwear 100 includes baseball cap 106, but can alternatively include a multiplicity of other forms of headwear, such as a visor or motorcycle helmet. Headwear 100 can also be a custom augmented reality headset as known in the art.

Battery 101 can be a flexible, rechargeable battery (e.g., lithium polymer battery PGEB021212 available on POWERSTREAM) that is attached to cap 106 using techniques known in the art. For example, battery 101 can be glued to cap 106 or, alternatively, removably attached to a battery compartment of cap 106. Battery 101 can also, for example, be printed onto a flexible substrate attached to cap 106 or attached to cap 106 and hidden from view by being embedded within cap 106. Battery 101 can also be protected from the elements by being housed in a small form factor hard plastic shell glued onto cap 106. Although FIG. 1 depicts battery 101 attached to the front of cap 106, battery 101 can also be attached to other locations of cap 106, such as to bill 105 of cap 106.

Circuitry 102 can be attached to cap 106, powered by battery 101, and include a central processing unit (CPU), a graphics processing unit (GPU), memory (e.g., RAM and/or ROM), and input/output transceivers or ports (I/O ports). In a preferred embodiment, circuitry 102 includes flexible electronics. Alternatively, circuitry 102 can be rigid. For example, a Qualcomm Snapdragon and conventional RAM, ROM, and I/O ports can serve as circuitry 102.

Circuitry 102 can be attached to cap 106 using techniques known in the art. For example, circuitry 102 can be glued to cap 106 or, alternatively, removably attached to a conventional housing compartment of cap 106. Circuitry 102 can also, for example, be printed onto a flexible substrate attached to cap 106 or attached to cap 106 and hidden from view by being embedded within cap 106. Circuitry 102 can also be protected from the elements by being housed in a small form factor hard plastic shell glued onto cap 106. Although FIG. 1 depicts circuitry 102 attached to bill 105 of cap 106, circuitry 102 can also be attached elsewhere to cap 106, such as attached to the front of cap 106.

Figure 2:
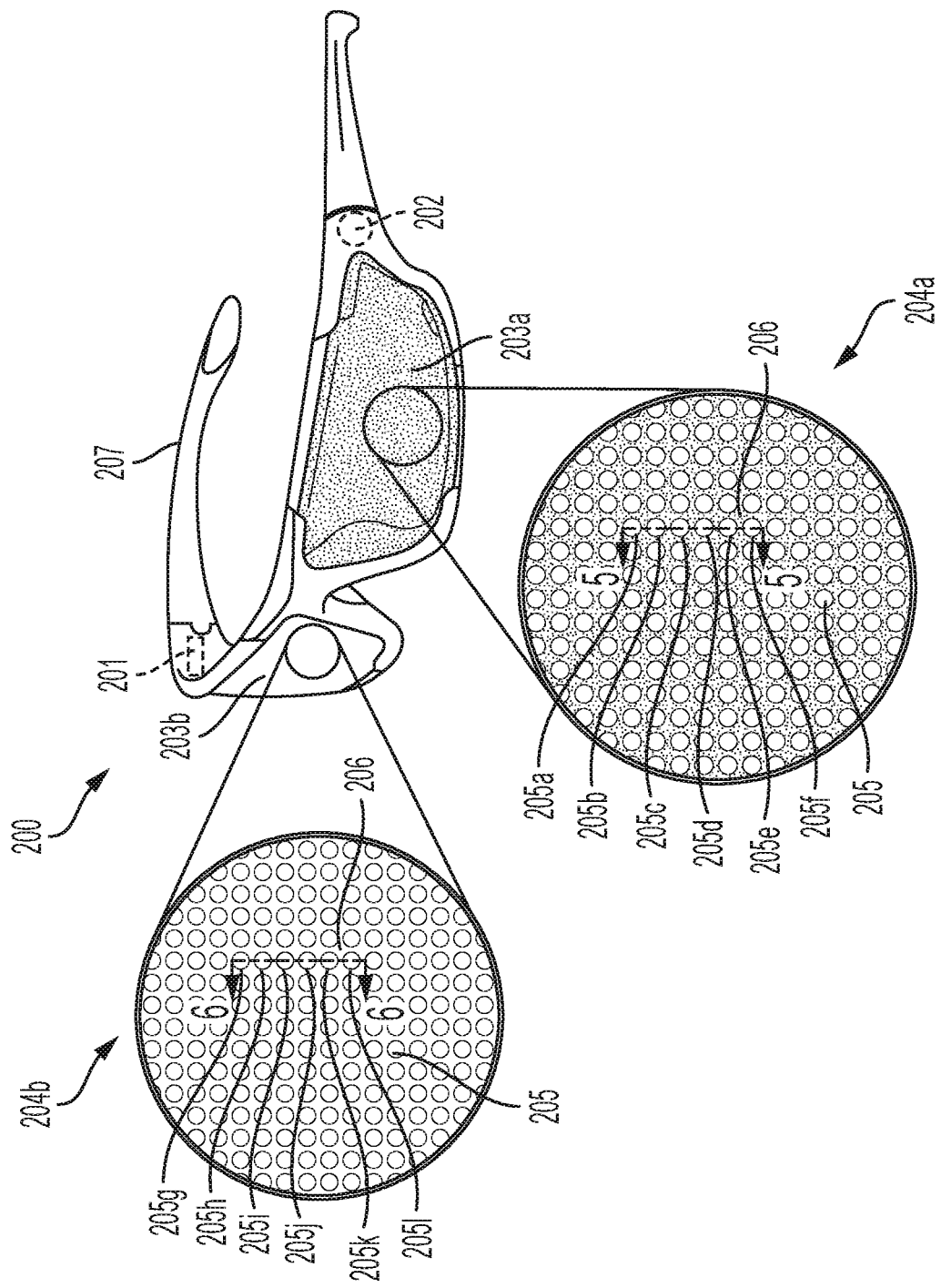
FIG. 2 is a perspective view of an embodiment of AR eyewear and further illustrates zoomed-in portions of the on-state and off-state lenses of the AR eyewear.

Projectors 104a, 104b can be mounted to gimbals (e.g., SNAP micro gimbals), which are attached to cap 106, to counteract the rotational movement of the user so as to provide a more stable augmented reality projection and experience to the user. Projectors 104a, 104b can also be attached to cap 106 using techniques known in the art, such as by gluing. Projectors 104a, 104b can be positioned towards the ends of cap 106, on the underside of bill 105 in front of the user, one on the left side (left projector 104a) and one on the right side (right projector 104b). Generally, projectors 104a, 104b can be located on cap 106 where they can project images towards lenses 203a, 203b (FIG. 2).

Projectors 104a, 104b can be, for example, pico-projectors (e.g., SEE100 laser-based pico-projector modules). Projectors 104a, 104b can electrically communicate with circuitry 102, as described herein, and be powered by battery 101.

Sensor array 103 can be attached to the outer rim of bill 105 of cap 106 (as shown) or, alternatively, to the front or rear of the cap 106, and include one or more of the following representative sensors: cameras (e.g., e-CAM131_CUMI1335_MOD-13MP 4K Camera Module); Light Detection and Ranging ("LIDAR") sensors (e.g., SEEEDSTUDIO GROVE-TF Mini LIDAR); microphones (e.g., ADAFRUIT AMP Microphone Adjustable 1528-1013-ND), accelerometers (e.g., ADAFRUIT FXOS8800 3-Axis accelerometer); GPS receivers (e.g., MEDIATEK MT3339); magnetic sensors (e.g., TEXAS INSTRUMENTS DRV5032 Ultra-low power Hall Effect Switch); humidity sensors (e.g., SENSIRION Humidity Sensor SHT3x); infrared cameras (e.g., FLIR Dev Kit); and temperature sensors (e.g., ADAFRUIT Thermocouple Amplifier 1528-1407-ND). Sensor array 103 can also be protected from the elements by using, for example, a plastic shell glued onto cap 106. Headwear 100 can also include more than one sensor array 103.

Sensor array 103 captures data from the environment surrounding the user and transmits the data to circuitry 102. In an embodiment, circuitry 102 processes the data to generate an augmented reality (AR) overlay image in an electronic format that can be interpreted by projectors 104a, 104b. Circuitry 102 then transmits the formatted AR overlay image to projectors 104a, 104b which, in turn, project the AR overlay image onto lenses 203a, 203b (FIG. 2).

FIG. 2 is a perspective view of an embodiment of augmented reality eyewear 200 and further illustrates zoomed-in portions 204a, 204b of the on-state and off-state lenses 203a, 203b, respectively, of eyewear 200. As shown in FIG. 2, eyewear 200 includes frame 207, lenses 203a, 203b, eyewear circuitry 201, and eyewear battery 202. Eyewear circuitry 201 can be housed within frame 207 using conventional techniques known in the art. Alternatively, eyewear circuitry 201 can be attached to frame 207, for example, by gluing.

Eyewear battery 202 can be housed within frame 207 or, for example, attached to frame 207 using known techniques such as gluing. Eyewear battery 202 is electrically connected to and powers eyewear circuitry 201.

A user can wear headwear 100 and eyewear 200 such that projectors 104a, 104b can shine an AR overlay image onto lenses 203a, 203b, respectively.

FIG. 2 further illustrates zoomed-in portion 204a of lens 203a and zoomed-in portion 204b of lens 203b. As explained in more detail below, lens 203a is illustrated in the on-state, and lens 203b is illustrated in the off-state. Also as explained in more detail below, lenses 203a, 203b include multiple layers, and zoomed-in portions 204a, 204b illustrate various aspects of conductive layers 502a of lenses 203a, 203b.

Figure 3:
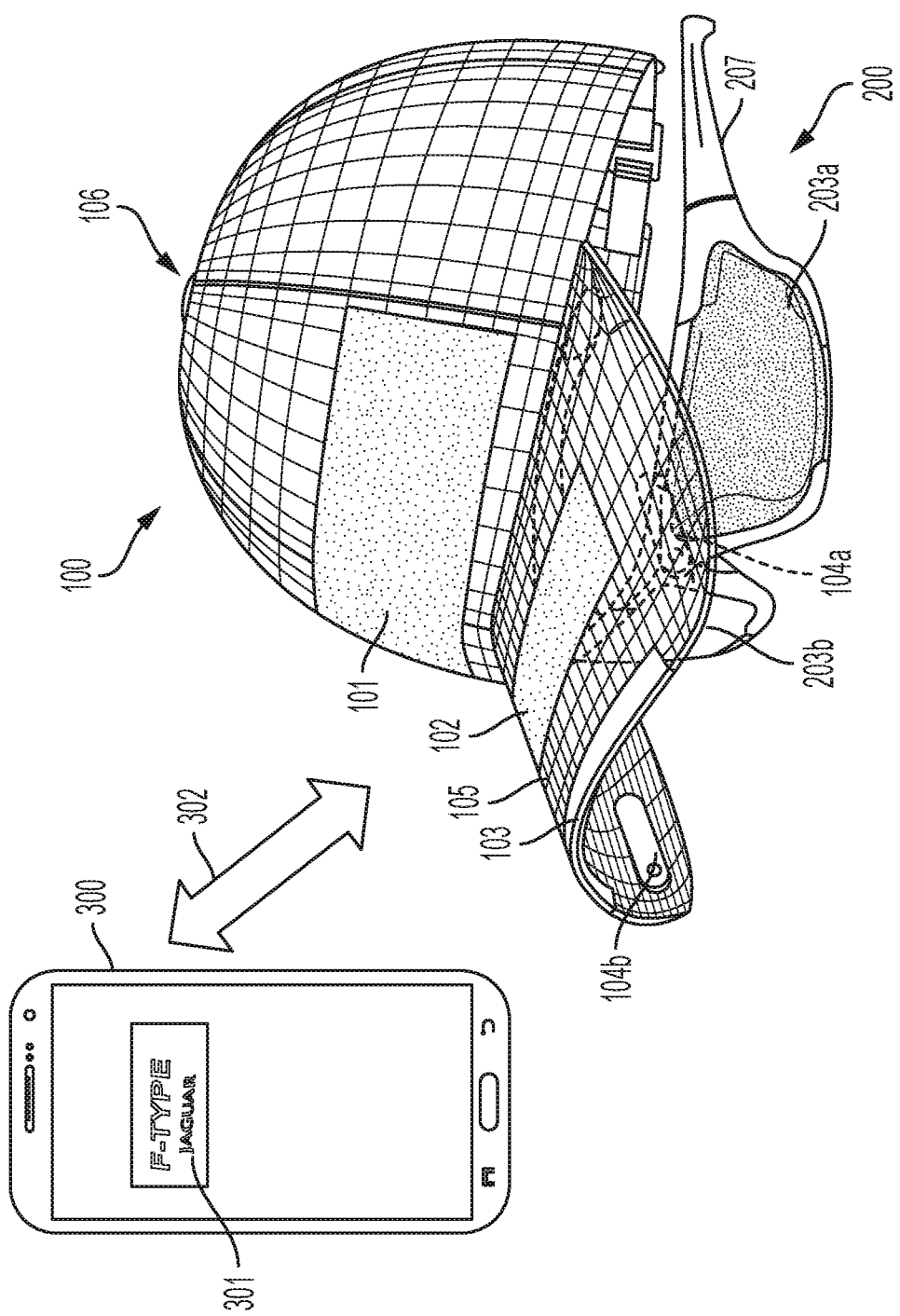
FIG. 3 shows a configuration of AR headwear and AR eyewear that utilizes an off board processor.

FIG. 3 shows a configuration of headwear 100 and eyewear 200 that utilizes off board processor 300. In this embodiment, circuitry 102 can transmit data to off board processor 300, such as one contained in a smartphone as shown in FIG. 3. Off board processor 300 and circuitry 102 can communicate via a conventional, two-way wireless connection 302, such as BLUETOOTH, WI-FI, or a mobile network connection. Alternatively, off board processor 300 and circuitry 102 can communicate via a wired connection, for example, via a conventional USB connection. Off board processor 300 processes the data received from circuitry 102, and can also process data captured by off board processor 300 itself, such as user input into a phone application that can be executed by off board processor 300, to generate the AR overlay image. Off board processor 300 then transmits AR overlay image 301 to circuitry 102. Circuitry 102 then processes AR overlay image 301 to an electronic format that can be transmitted to projectors 104a, 104b, which project AR overlay image 301 onto lenses 203a, 203b.

Figure 4:
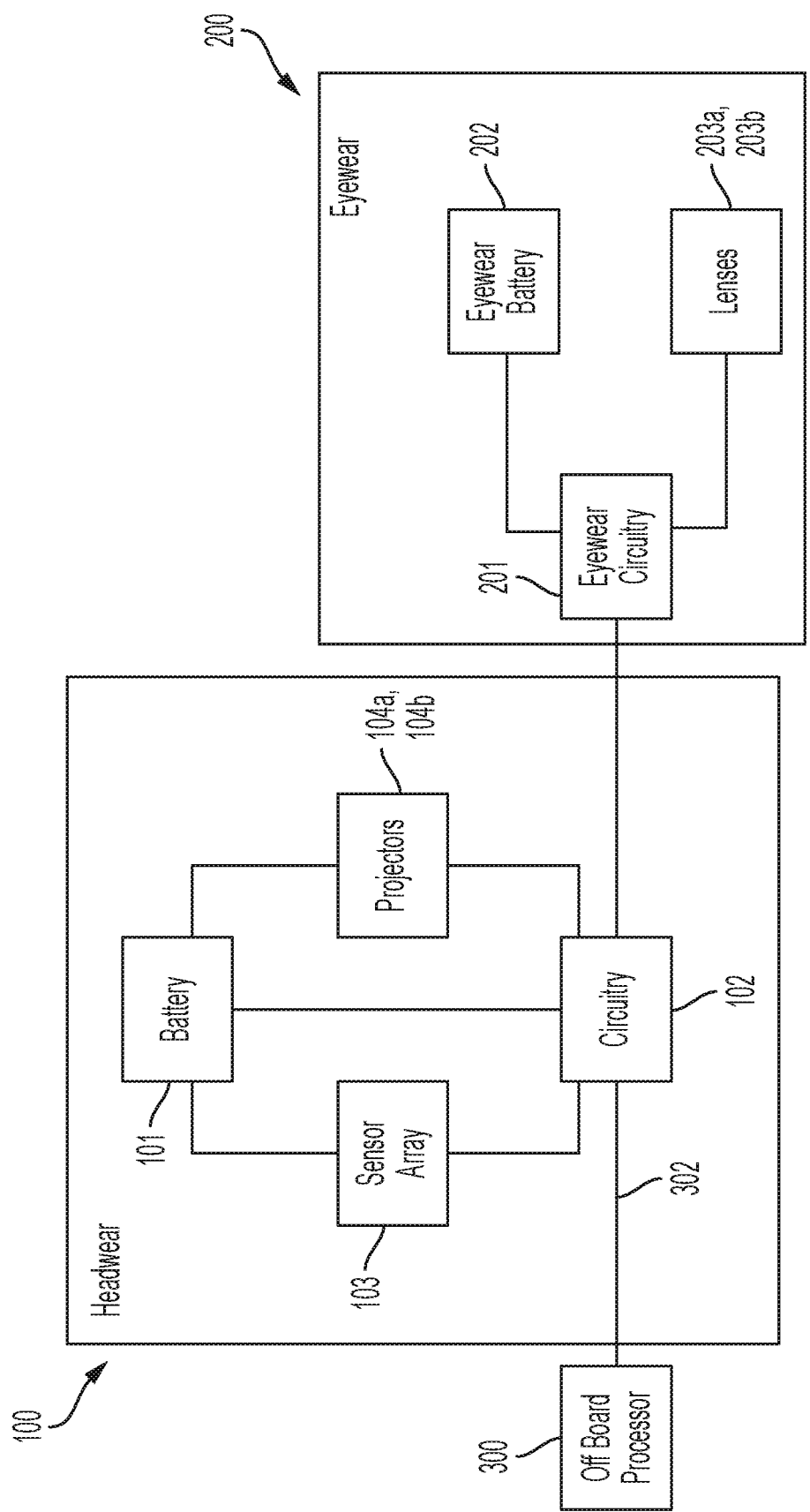
FIG. 4 is a block diagram that shows the electrical interfaces between various components of AR headwear and AR eyewear.

FIG. 4 is a block diagram that shows the electrical interfaces between various components of headwear 100 and eyewear 200. The communication links between the components shown in FIG. 4 can be wired or wireless connections.

Figure 5:
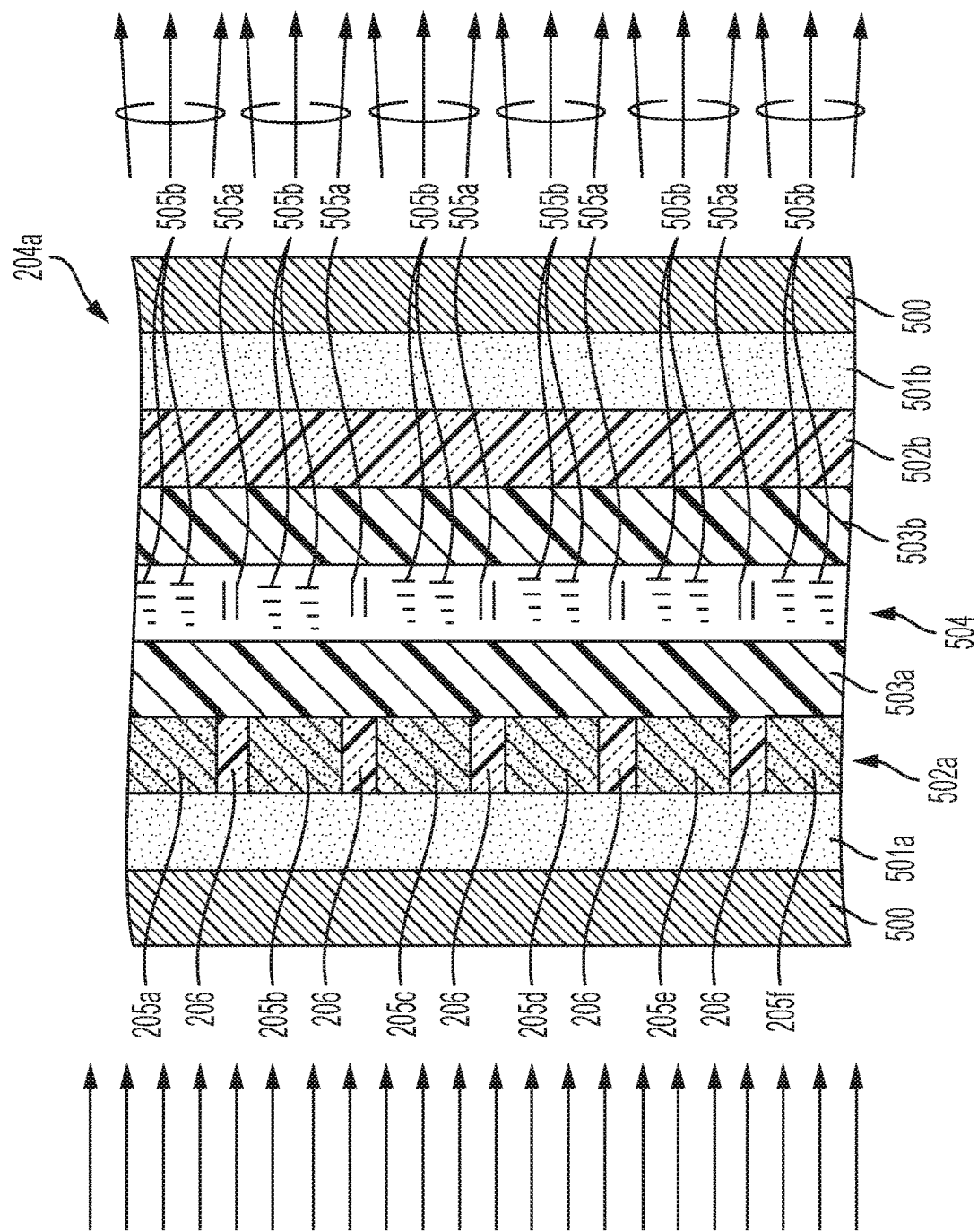
FIG. 5 is a partial cross-section view along line 5-5 of the zoomed-in portion of the on-state lens of the eyewear shown in FIG. 2.
Figure 6:
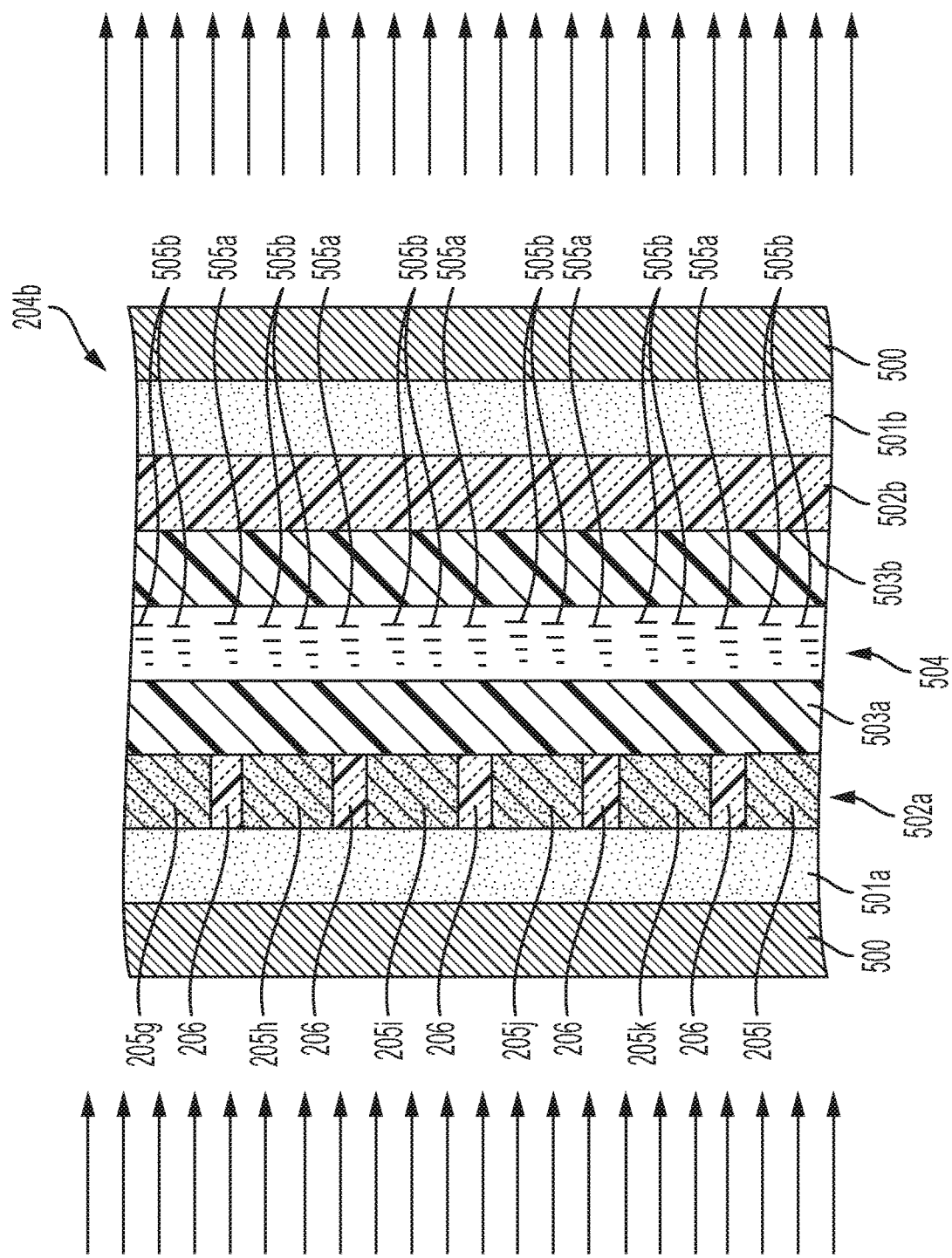
FIG. 6 is a partial cross-section view along line 6-6 of the zoomed-in portion of the off-state lens of the eyewear shown in FIG. 2.

FIG. 5 is a partial cross-section view along line 5-5 of zoomed-in portion 204a of on-state lens 203a cut across first regions 205a-205f. FIG. 6 is a partial cross-section view along line 6-6 of zoomed-in portion 204b of off-state lens 203b cut across first regions 205g-205l. As shown, lenses 203a, 203b include filters 501a, 501b, conductive layers 502a, 502b, alignment layers 503a, 503b, liquid crystal layer 504, and housing layer 500, which are positioned in a manner largely consistent with conventional liquid crystal displays.

First filter 501a and second filter 501b can be linear polarized filters aligned such that they are polarized substantially orthogonally with respect to each other. For example, in FIGS. 5 and 6, first filter 501a is horizontally polarized, which corresponds to being polarized substantially orthogonally to lines 5-5 and 6-6 in FIG. 2 and into and out of the plane of the page depicted in FIGS. 5 and 6. Second filter 501b is vertically polarized, which corresponds to being polarized parallel to lines 5-5 and 6-6 in FIG. 2 and vertically along the page depicted in FIGS. 5 and 6. These polarities are illustrative, and first filter 501a and second filter 501b could also be positioned differently so long as their polarities are substantially orthogonal with respect to each other.

First conductive layer 502a and second conductive layer 502b are respectively positioned proximate to substantially orthogonally polarized filters 501a, 501b. One of conductive layer 502a or 502b can be a conventional common electrode. In the depicted embodiment, conductive layer 502b serves as the conventional common electrode. As described in more detail below, and as shown in FIG. 5, FIG. 6, and zoomed-in portions 204a, 204b of FIG. 2, first conductive layer 502a includes first regions 205 and second region 206. First alignment layer 503a and second alignment layer 503b are respectively positioned proximate first conductive layer 502a and second conductive layer 502b. As is conventional for liquid crystal displays, first alignment layer 503a and second alignment layer 503b are preferably etched linearly and aligned such that they are etched substantially orthogonally to each other, and such that the etchings of first alignment layer 503a are parallel to the polarity of first filter 501a and the etchings of second alignment layer 503b are parallel to the polarity of second filter 501b. For example, in the depicted embodiment, first alignment layer 503a is etched horizontally, and second alignment layer 503b is etched vertically.

Liquid crystal layer 504, which is positioned in a conventional manner between alignment layers 503a, 503b, includes conventional liquid crystals 505a, 505b. As the result of the conventional configuration of alignment layers 503a, 503b and liquid crystal layer 504, when no voltage is applied across conductive layers 502a, 502b, liquid crystals 505a, 505b are in a 90-degree twisted helix configuration such that horizontally polarized light which passed through the horizontally polarized first filter 501a will twist 90 degrees when passing through liquid crystal layer 504 and will be able to pass through the vertically polarized second filter 501b. Housing layer 500 can be made from, for example, glass or plastic, and be used to house filters 501a, 501b, conductive layers 502a, 502b, alignment layers 503a, 503b, and liquid crystal layer 504.

The partial cross-section view of FIG. 5 falls specifically along first regions 205a-205f of first regions 205, and the partial cross-section view of FIG. 6 falls specifically along first regions 205g-205l of first regions 205. First regions 205 can be circular shaped as shown in zoomed-in portions 204a, 204b of FIG. 2, but can also be approximately circular, hexagonal, octagonal, or any other shape (or combination of shapes) that can provide sufficient diffraction of visible light without generating unwanted image artifacts or chromatic aberration. First regions 205 which are circular in shape can be advantageous because light passing through circular regions diffracts in a predictable manner.

First regions 205 are electrically isolated from second region 206. First conductive layer 502a with first regions 205 electrically isolated from second region 206 can be created by applying conventional techniques, such as ultraviolet lithography or extreme ultraviolet lithography, to a transparent conducting material. First regions 205 can be made of, for example, a transparent insulator. Alternatively, first regions 205 can be made of a transparent conducting material, and a transparent insulator can be deposited along the perimeter of first regions 205 so that first regions 205 are electrically isolated from second region 206. Eyewear circuitry 201 is electrically connected to second region 206 using conventional techniques (e.g., electrical connections similar to active matrix liquid crystal displays) such that eyewear circuitry 201 can be used to generate and selectively apply a voltage across second regions 206 and second conductive layers 502b of lenses 203a, 203b to activate a portion of liquid crystal layer 504.

A lens 203a, 203b is in the on-state when a voltage is applied across second region 206 and second conductive layer 502b. A voltage is not applied across first regions 205 and second conductive layer 502b in the on-state. In operation, the applied voltage will create an electric field between second region 206 and second conductive layer 502b, which will cause liquid crystals 505a—the liquid crystals disposed between second region 206 and second conductive layer 502b—to align in the direction of the electric field, thereby losing their ability to act as a waveguide that shifts the polarization of incident light by 90 degrees. As a result, light passing through second region 206 will not twist while passing liquid crystal layer 504 and accordingly will not pass through second filter 501b.

More particularly, incoming light will first pass through housing layer 500, and then light of the requisite polarity will pass through first filter 501a. The light will next pass through second region 206 of first conductive layer 502a and first alignment layer 503a. The light will then pass through liquid crystal layer 504 where its polarity will not be twisted due to the electric field aligning liquid crystals 505a. The light will then pass through second alignment layer 503b and second conductive layer 502b, but the light will not pass through the corresponding portions of second filter 501b because the polarity of the light is substantially orthogonal to the polarity of second filter 501b. As a result, the light will not reach a user's eye. The portion of zoomed-in portion 204a which includes second region 206 is shaded for purposes of illustrating that light passing through second region 206 will not twist or pass through second filter 501b of lens 203a.

Turning now to first regions 205, even when lens 203a (or 203b) is in the on-state, a voltage will not be applied across first regions 205 and second conductive layer 502b. As a result, liquid crystals 505b, which are the liquid crystals disposed between first regions 205 and second conductive layer 502b, will not align and will thus act as waveguides by twisting the polarization of incident light by 90 degrees. As a result, in the on-state, light passing through first regions 205 will pass through the corresponding portions of second filter 501b and housing layer 500, and then, to a user's eye.

More particularly, incoming light will first pass through housing layer 500, and then light of the requisite polarity will pass through first filter 501a. The light will next pass through one of the first regions 205 of first conductive layer 502a and first alignment layer 503a. The light will then pass through liquid crystal layer 504 of lens 203a, where the light's polarity will be twisted 90 degrees by liquid crystals 505b of liquid crystal layer 504. The light's polarity is now substantially orthogonal to its original polarity and is thus of the same polarity as second filter 501b. The light will then pass through second alignment layer 503b, second conductive layer 502b, second filter 501b, and housing layer 500 and will ultimately reach the user's eye. Note that the portion of zoomed-in portion 204a which includes first regions 205 is unshaded for purposes of illustrating that light passing through first regions 205 will pass through second filter 501b of lens 203a. Though light can pass through first regions 205 in the manner described above, first regions 205 are sized to diffract the light exiting an on-state lens, as explained below.

Turning now to FIG. 6, a lens 203a, 203b is in the off-state when no voltage is applied across conductive layers 502a, 502b. Light can pass through lens 203b in the off-state. More specifically, light will first pass through housing layer 500. The light polarized in the same direction as first filter 501a will then pass through first filter 501a. That light will then pass through first conductive layer 502a and first alignment layer 503a. The light will next pass through liquid crystal layer 504 where the liquid crystals 505a, 505b act as a waveguide to twist the polarization of light 90 degrees. As a result of the 90 degree change in polarization by liquid crystal layer 504, the incident light will now be polarized in the same direction as second filter 501b, which, as noted above, is aligned to have its polarity be substantially orthogonal to first filter 501a. The light will finally pass through second alignment layer 503b, second conductive layer 502b, second filter 501b, and housing 500 and ultimately reach the user's eye.

Circuitry 102 and eyewear circuitry 201 communicate to synchronize such that left projector 104a shines an image onto lens 203a only when lens 203a is in the on-state, and right projector 104b shines an image onto lens 203b only when lens 203b is in the on-state. Circuitry 102 and eyewear circuitry 201 can communicate wirelessly, for example via BLUETOOTH, WI-FI, or a mobile network connection. Alternatively, circuitry 102 and eyewear circuitry 201 can communicate via a wired connection, for example, via a conventional USB connection. Circuitry 102 and eyewear circuitry 201 can be synchronized using conventional synchronization techniques.

To create an augmented reality experience, lenses 203a, 203b are rapidly pulsed, as described further below, between the on-state and the off-state. Lenses 203a, 203b can be pulsed between the on-state and off-state at the same time. Alternatively, to reduce eye fatigue, lenses 203a, 203b can be pulsed sequentially. That is, lens 203a can be in the off-state when lens 203b is in the on-state (and vice versa).

When a lens 203a, 203b is in the on-state, the corresponding projector 104a, 104b projects an AR overlay image onto the corresponding lens 203a, 203b. To improve field of view, projectors 104a, 104b can be configurable to project images across all or a substantial portion of corresponding lenses 203a, 203b. When a lens 203a, 203b is in the off-state, light from the corresponding projector 104a, 104b is turned off, and the user perceives the outside environment. Because lenses 203a, 203b are rapidly pulsed between the on-state and the off-state, the user's brain will combine each of the AR overlay images projected by projectors 104a, 104b during each on-state cycle with the surrounding real-world environment, which together form an augmented reality experience. Because light only passes through first regions 205 when a lens 203a, 203b is in the on-state, an on-state lens 203a, 203b can improve depth of field similar to how pinhole glasses improve depth of field. Additionally, because a portion of light from the surroundings is blocked when a lens 203a, 203b is in the on-state, visible transparency of the projected AR virtual images is advantageously reduced.

To reduce flicker, lenses 203a, 203b are preferably pulsed at or above 24 hertz (i.e., at least 24 complete on-state/off-state cycles each second such that the lens is in each of the states at least 24 times per second). To improve the quality of the augmented reality experience perceived by the user, when a lens 203a, 203b is in the on-state, the corresponding projector 104a, 104b can preferably refresh the AR overlay image projected during that on-state cycle multiple times. For example, in an embodiment, lenses 203a, 203b are pulsed at 24 hertz, and the projectors 104a, 104b refresh each of the projected AR overlay images 10 times during each on-state cycle.

Figure 7A:
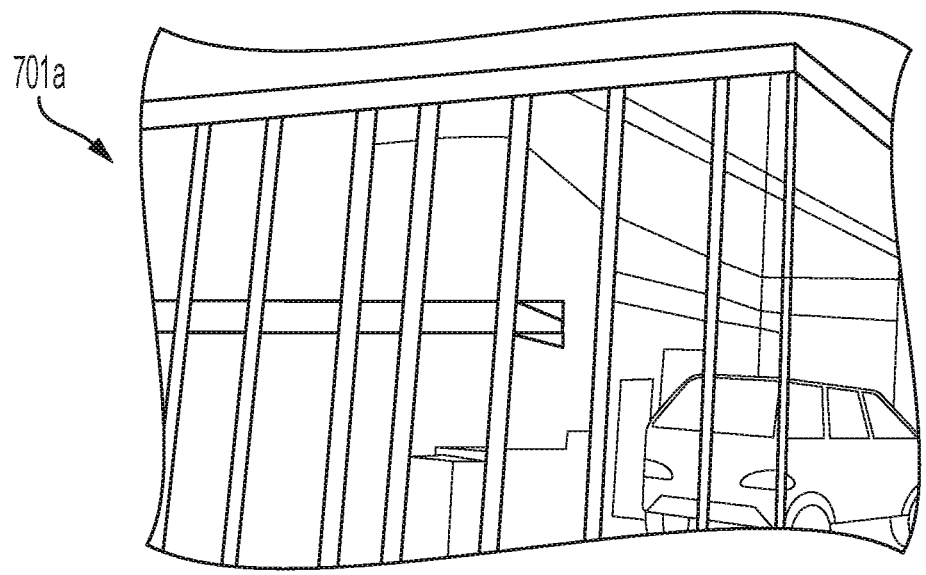
FIG. 7A is an image of an outside environment.
Figure 7B:
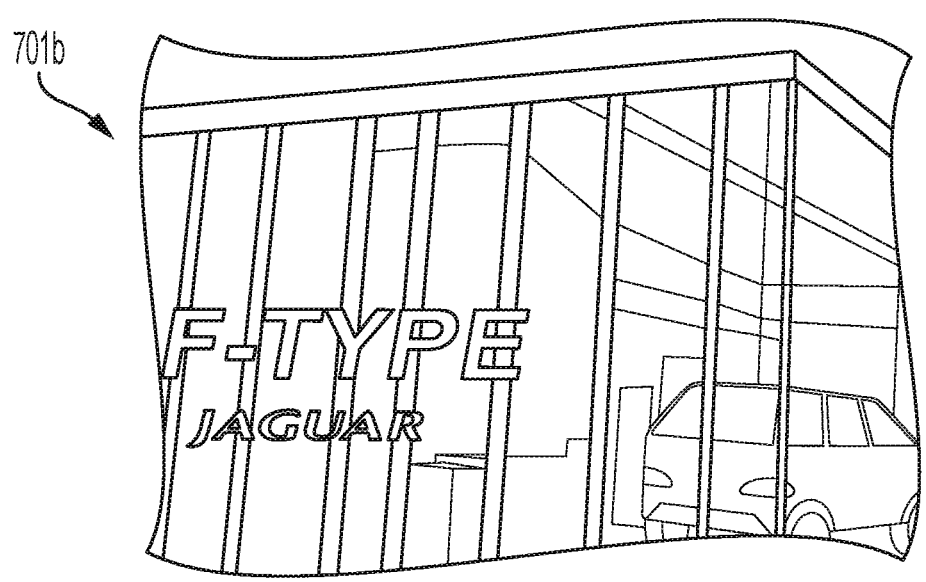
FIG. 7B is an image of an augmented reality experience, which includes an AR overlay superimposed with the outside environment of FIG. 7A.

FIG. 7A is an image of outside environment 701a. FIG. 7B is an image of an augmented reality experience 701b, which includes AR overlay image 301 superimposed with outside environment 701a. In an embodiment, to achieve the exemplary augmented reality experience 701b, a camera sensor of sensor array 103 captures an image of outside environment 701a. Circuitry 102 receives information associated with the captured image from the camera sensor and transmits the information via wireless connection 302 to off board processor 300, which processes the image captured by the camera sensor to determine the appropriate AR overlay image to project onto the lenses 203a, 203b. In the depicted example, off board processor 300 determines that AR overlay image 301 (FIG. 3), which includes the words "F-TYPE JAGUAR," should be projected onto lenses 203a 203b and communicates the "F-TYPE JAGUAR" AR overlay image 301 back to circuitry 102 via wireless connection 302. Circuitry 102 then processes the "F-TYPE JAGUAR" AR overlay image 301 into an electronic format that can be interpreted by the projectors 104a, 104b and communicates that information to projectors 104a, 104b.

As described above, lenses 203a, 203b are rapidly pulsed between the on-state and off-state, for example at or above 24 Hz. Projectors 104a, 104b project the "F-TYPE JAGUAR" AR overlay image 301 onto lenses 203a, 203b, respectively, while the corresponding lens is in the on-state. In the off-state, projectors 104a, 104b are turned off, and light from the outside environment passes through lenses 203a, 203b in the manner described above. Circuitry 102 and eyewear circuitry 201 communicate to ensure projectors 104a, 104b and lenses 203a, 203b are synchronized to simultaneously switch between the on-state and the off-state. As a result, the user perceives AR overlay image 301 to be seamlessly combined with the outside environment 701a, as augmented reality experience 701b.

The design of first regions 205 will now be described. Eyewear 200 can include first regions 205 of a fixed size. The size of first regions 205 is determined such that, when lens 203a, 203b is in the on-state, light passing through the corresponding first regions 205 will diffract an amount which is appropriate to create the desired augmented reality image. Equation (1) relates the wavelength of light and the size of first regions 205 to the angle of diffraction.

$$1.22*(\lambda/a) \approx \theta \quad (1)$$

In equation (1), "$\lambda$" is the wavelength of light in meters, "a" is the diameter of first regions 205 of circular shape in meters, and "$\theta$" is the angle of diffraction in radians.

Equation (2) relates the wavelength of light and the size of first regions 205 to the intensity of the light passing through circular first regions 205 of an on-state lens.

$$I=I0((\sin(\theta/2))/(\theta/2))^2 \quad (2)$$

In equation (2), "I" is the intensity, "$\theta$" is the angle of diffraction in radians, and "I0" is the intensity at the degree specified.

First regions 205 must be sized to obtain an appropriate angle of diffraction. The angle of diffraction of the light passing through first regions 205 must be greater than zero degrees because, without any diffraction, light passing through a particular first region 205 which is not directly in the user's line of sight would not be viewable to the user because no light would be angled towards the user's eye. However, if the angle of diffraction is too large, insufficient light may reach the user's eye, and image resolution may be blurry.

The angle of diffraction can be between, for example, approximately 1 and 12 degrees. For example, using equation (1), if $\theta$=12 degree is desired for red light (i.e., light with a wavelength of approximately 650 nm), then first regions 205 should be approximately 3,786 nm wide. If $\theta$=12 is desired for green light (i.e., light with a wavelength of approximately 532 nm), then first regions 205 should be approximately 3,099 nm wide. If $\theta$=12 is desired for blue light (i.e., light with a wavelength of approximately 445 nm), then first regions 205 should be approximately 2,592 nm wide. According to equation (2), in each of these cases, the resulting light passing through first regions 205 will be approximately 99.6 percent of the intensity of the original incident light.

First regions 205 must also be appropriately spaced apart. If first regions 205 are spaced too far apart from each other, then too much of the AR overlay will be blocked by the lenses in the on-state. In this case, the user may perceive an incomplete AR overlay, and the user may perceive the AR overlay in multiple fragments. Some spacing between each of the first regions 205 can be desirable, however, so that an on-state lens receiving a portion of the AR overlay can block a sufficient portion of light from the real-world environment to avoid the "ghost effect"—that is, to prevent the AR overlay from appearing transparent or translucent.

For example, first regions 205 can be approximately 4,143 nm in diameter and be spaced approximately 1,035 nm apart from end-to-end (i.e., be spaced approximately 5,178 nm apart center-to-center). With these dimensions, using equation (1), θ is approximately 9.0 degrees for light of 532 nm in wavelength. Also with these dimensions, the size of first regions 205 and the surface area ratio between first regions 205 and second region 206 is appropriate to permit the system to reduce the "ghost effect" without sacrificing appropriate viewing of the virtual image by a user.

It is well-understood in the art that a virtual image is made of a plurality of pixels, which are the smallest controllable elements that together form the image. It is also well-understood in the art that the angular resolution of a virtual image is preferably at least 1 pixel per arcminute (where 1 degree equals 60 arcminutes). Equation (3) relates angular resolution to viewing distance and pixel size.

$$\text{tangent}(R/2)=(PS)/(2*VD) \quad (3)$$

In equation (3), "R" is the angular resolution, and "PS" and "VD" are the pixel size and viewing distance, respectively. The viewing distance for the present invention is the distance between the human retina and the corresponding lens 203a, 203b, which can be approximated by 0.7 inches (≈0.0178 m) in the scenario where a user wears eyewear 200 in a conventional manner. As just stated, an angular resolution of at least 1/60 of a degree (i.e., one arcminute) is preferable. With these parameters, the pixel size must be no greater than approximately 5,178 nm. This means that, to achieve the preferred angular resolution of 1 arcminute per pixel, the centers of each of the pixels making up the AR overlay image shined onto lenses 203a, 203b should be spaced no greater than 5,178 nm apart. As stated previously, the size of first regions 205 accommodating 5,178 nm pixels can be, for example, 4,143 nm, with an end-to-end spacing between the centers of first regions 205 of 1,035 nm.

Figure 8:
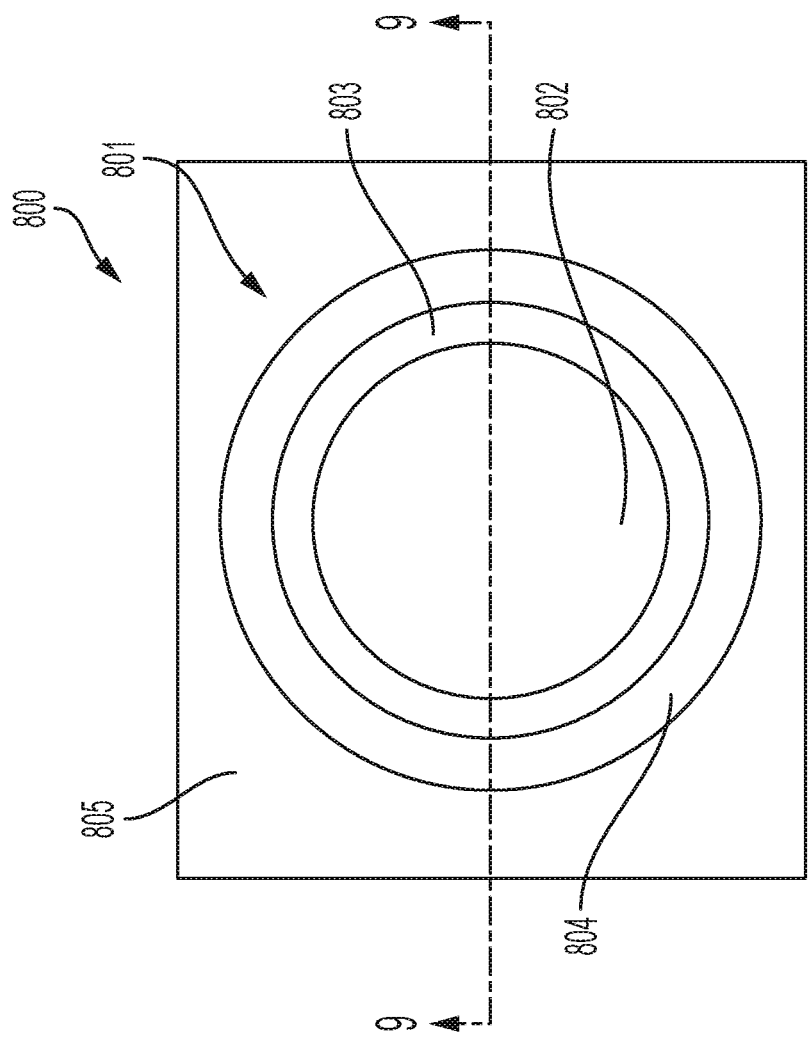
FIG. 8 is a zoomed-in portion of one of a plurality of multi-size first regions of a conductive layer according to another embodiment of the invention.
Figure 9:
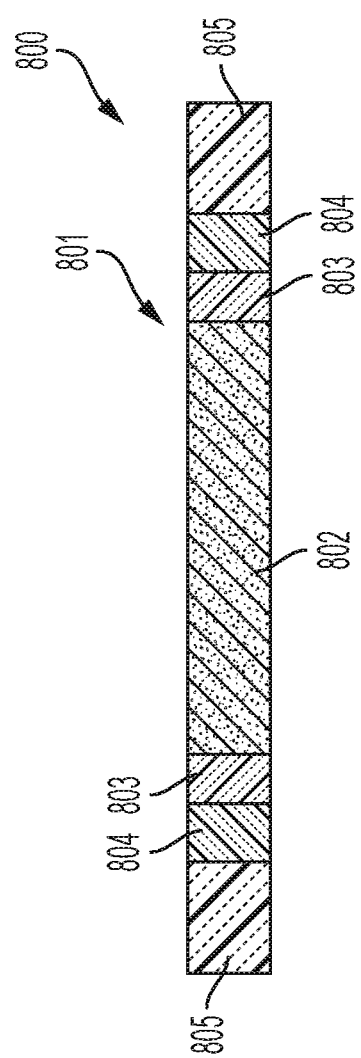
FIG. 9 is a cross-section view along line 9-9 of the zoomed-in portion shown in FIG. 8.

FIGS. 8 and 9 depict a portion of first conductive layer 502a according to an alternative embodiment of the invention which can reduce chromatic aberration. According to the embodiment depicted in FIGS. 8 and 9, the first regions of first conductive layers 502a of lenses 203a, 203b are multi-size first regions 801. FIG. 8 is a zoomed-in portion 800 of one of a plurality of multi-size first regions 801 of first conductive layer 502a. FIG. 8 further illustrates a portion of second region 805 of first conductive layer 502a. FIG. 9 is a cross-section view along line 9-9 of zoomed-in portion 800. As shown in FIGS. 8 and 9, each of the multi-size first regions 801 include first zone 802, second zone 803, and third zone 804. First zones 802, second zones 803, third zones 804, and second region 805 of the multi-size first regions 801 are all electrically isolated from one-another.

First conductive layer 502a with first zones 802, second zones 803, third zones 804, and second region 805 can be created by applying conventional techniques, such as ultraviolet lithography or extreme ultraviolet lithography, to a transparent conducting material. Second zones 803, third zones 804, and second region 805 can be made of, for example, a transparent conducting material. Second zones 803 and third zones 804 can be electrically isolated via a transparent insulator located in the space between the outer perimeters of second zones 803 and the inner perimeters of third zones 804 so that second zones 803 and third zones 804 are electrically isolated from each other. Similarly, third zones 804 and second region 805 can be electrically isolated, for example, via a transparent insulator deposited along the outer perimeter of third zones 804 so that third zones 804 are electrically isolated from second region 805.

First zones 802 can be made of, for example, a transparent insulator. Alternatively, first zones 802 can be made of a transparent conducting material, and a transparent insulator can be deposited between the outer perimeters of first zones 802 and the inner perimeters of second zones 803 so that first zones 802 and second zones 803 are electrically isolated from each other.

Eyewear circuitry 201 can be connected to second zones 803, third zones 804, and second region 805 using conventional techniques. First zone 802, second zone 803, and third zone 804 can be circular shaped as shown in FIG. 8, but can also be approximately circular, hexagonal, octagonal, or other shapes that can provide sufficient diffraction at the wavelength of interest without generating unwanted image artifacts.

To generate an augmented reality experience, eyewear circuitry 201 rapidly pulses lenses 203a, 203b, which include a plurality of multi-size first regions 801, between an "off-state," a "first on-state," a "second on-state," and a "third on-state."

When a lens 203a, 203b is in the off-state, no voltage is applied across any portion of the conductive layers 502a, 502b of the on-state lens 203a, 203b, and thus light passes through an off-state lens.

When a lens 203a, 203b is in the first on-state, eyewear circuitry 201 applies a voltage across second conductive layer 502b and the following portions of first conductive layer 502a of the lens 203a, 203b: the second zones 803, the third zones 804, and second region 805. As a result, light impinging a lens 203a, 203b in the first on-state can pass through only the portion of the lens 203a, 203b, which includes the first zones 802.

When a lens 203a, 203b is in the second on-state, eyewear circuitry 201 applies a voltage across second conductive layer 502b and the following portions of first conductive layer 502a of the lens 203a, 203b: the third zones 804 and second region 805. As a result, light impinging a lens 203a, 203b in the second on-state can pass through only the portion of the lens 203a, 203b, which includes first zones 802 and second zones 803. First zones 802 and second zones 803 together form a plurality of first combined regions, which are larger in size than the first zones 802.

When a lens 203a, 203b is in the third on-state, eyewear circuitry 201 applies a voltage across second conductive layer 502b and second region 805 of first conductive layer 502a of the lens 203a, 203b. As a result, light impinging a lens 203a, 203b in the third on-state can pass through only the portion of the lens 203a, 203b which includes first zones 802, second zones 803, and third zones 804, which together form a plurality of second combined regions. The plurality of second combined regions are larger in size than the plurality of first combined regions.

Circuitry 102 breaks down each AR overlay image into a red image that can be generated by the red light laser of projectors 104a, 104b, a green image that can be generated by the green light laser of projectors 104a, 104b, and a blue image that can be generated by the blue light laser of projectors 104a, 104b, such that the red image, green image, and blue image can combine to form the AR overlay image.

In an embodiment, while lenses 203a, 203b are rapidly pulsed between the off-state, first on-state, second on-state, and third on-state, the corresponding projectors 104a, 104b selectively project the red image when the corresponding lens 203a, 203b is in the third on-state, the green image when the corresponding lens is in the second on-state, and the blue image when the corresponding lens is in the first on-state. Projectors 104a, 104b do not project an image when the corresponding lens 203a, 203b is in the off-state.

First zones 802, second zones 803, and third zones 804 can be sized such that red light passing through lenses 203a, 203b in the third on-state, green light passing through lenses 203a, 203b in the second on-state, and blue light passing through lenses 203a, 203b in the first on-state will each diffract approximately the same amount, which is preferable to minimize chromatic aberration. For example, if each of the first zones 802 is approximately 2,592 nm wide, each of the second zones 803 is approximately 253.5 nm thick, and each of the third zones is approximately 343.5 nm thick, then according to equation (1), red light with a wavelength of 650 nm passing through lenses 203a, 203b in the third on-state, green light with a wavelength of 532 nm passing through lenses 203a, 203b in the second on-state, and blue light with a wavelength of 445 nm passing through lenses 203a, 203b in the first on-state will each diffract approximately 12 degrees.

Because lenses 203a, 203b are rapidly pulsed between each of the states, the user's brain seamlessly combines each of the red, green, and blue images into the appropriate AR images, and combines each of the AR images with the outside environment to create the desired augmented reality experience. To reduce flicker, lenses 203a, 203b are preferably pulsed at or above 24 hertz (i.e., every second, each lens preferably completes at least 24 complete off-state, first on-state, second on-state, and third on-state cycles such that the lens is in each of the four states at least 24 times per second). To improve the quality of the augmented reality experience perceived by the user, the projectors 104a, 104b preferably refresh each of the red images, green images, and blue images projected onto the corresponding lens 103a, 103b multiple times before switching to the next state.

Lenses 203a, 203b can be rapidly pulsed between each of the states at the same time. Alternatively, lenses 203a, 203b can be pulsed out-of-sequence. For example, in an embodiment, lens 203a can be in the off-state while lens 203b pulses between the first on-state, second on-state, and third on-state, and vice-versa.

Figure 10:
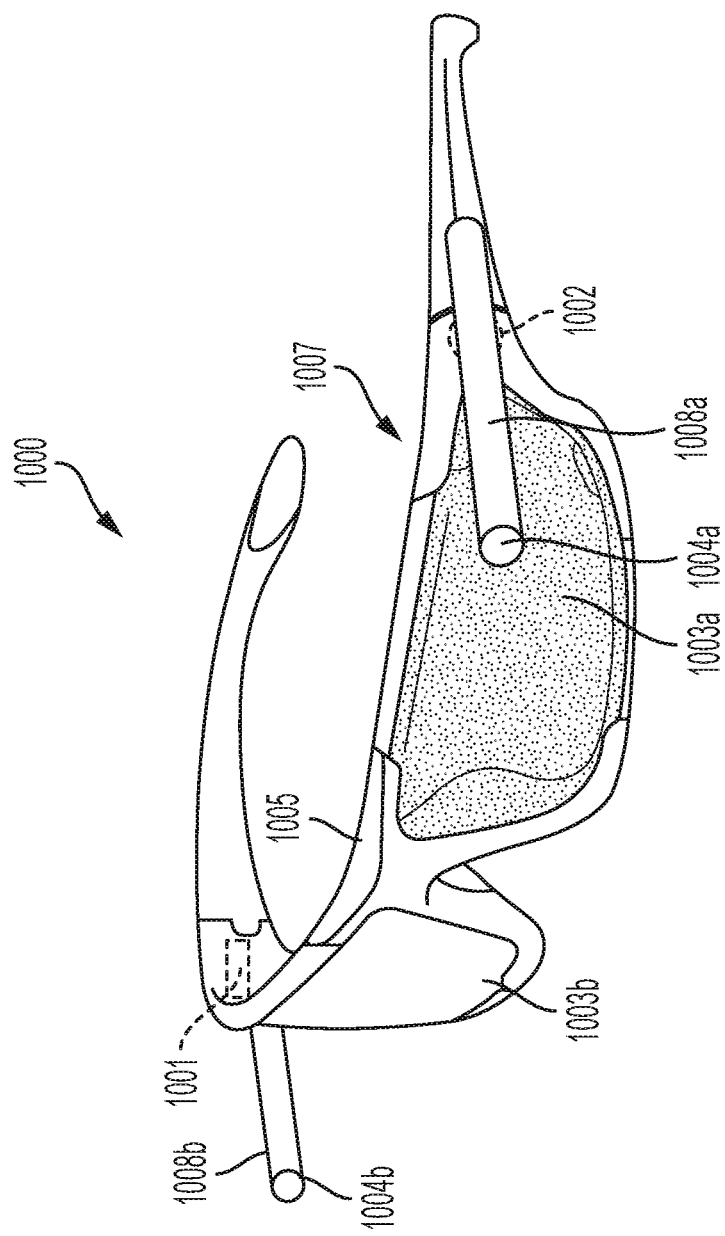
FIG. 10 is a perspective view of an embodiment of the augmented reality eyewear which does not utilize accompanying headwear.

FIG. 10 is a perspective view of an embodiment of augmented reality eyewear which does not utilize accompanying headwear. As shown in FIG. 10, Eyewear 1000 includes frame 1007, lenses 1003a, 1003b, eyewear circuitry 1001, and eyewear battery 1002. Eyewear circuitry 1001 can be housed within frame 1007. Alternatively, eyewear circuitry 1001 can also be attached to frame 1007 using known techniques such as gluing. Eyewear circuitry 1001 can include a CPU, GPU, memory, and I/O ports. For example, a Qualcomm Snapdragon and conventional RAM, ROM, and I/O ports can serve as circuitry 102. Lenses 1003a, 1003b can be configured, for example, in accordance with any of the embodiments described previously.

Eyewear battery 1002 can be housed within frame 1007 or, for example, attached to frame 1007 using known techniques such as gluing. Eyewear battery 1002 is electrically connected to and powers eyewear circuitry 201.

Frame 1007 further includes booms 1008a, 1008b. Projectors 1004a, 1004b are attached to booms 1008a, 1008b, using conventional techniques, such as by gluing. Generally, projectors 1004a, 1004b can be located on frame 1007 where they can project images towards lenses 1003a, 1003b. Projectors 1004a, 1004b can be, for example, pico-projectors (e.g., SEE100 laser-based pico-projector module). Projectors 1004a, 1004b can electrically communicate with eyewear circuitry 1001, as described herein, and be powered by battery 1002.

Eyewear 1000 further includes sensor array 1005 attached to eyewear 1000. Sensor array 1005 can include one or more sensors, such as one or more of the following representative sensors: cameras (e.g., e-CAM131_CUMI1335_MOD-13MP 4K Camera Module); Light Detection and Ranging ("LIDAR") sensors (e.g., SEEEDSTUDIO GROVE-TF Mini LIDAR); microphones (e.g., ADAFRUIT AMP Microphone Adjustable 1528-1013-ND), accelerometers (e.g., ADAFRUIT FXOS8800 3-Axis accelerometer); GPS receivers (e.g., MEDIATEK MT3339); magnetic sensors (e.g., TEXAS INSTRUMENTS DRV5032 Ultra-low power Hall Effect Switch); humidity sensors (e.g., SENSIRION Humidity Sensor SHT3x); infrared cameras (e.g., FLIR Dev Kit); and temperature sensors (e.g., ADAFRUIT Thermocouple Amplifier 1528-1407-ND). Sensor array 1005 can be protected from the elements by using, for example, a plastic shell glued onto eyewear 1000. Eyewear 1000 can also include more than one sensor array 1005.

Although FIG. 10 depicts sensor array 1005 located on the bridge of frame 1007, sensor array 1005 can also be located elsewhere on frame 1007, such as on the temples of frame 1007. In addition, some embodiments include more than one sensor array 1005. Sensor array 1005 can electrically communicate with eyewear circuitry 1001. By attaching projectors 1004a, 1004b onto frame 1007 and controlling projectors 1004a, 1004b with eyewear circuitry 1001, eyewear 1000 does not have to utilize accompanying headwear.

Sensor array 1005 captures data from the environment surrounding the user and transmits the data to eyewear circuitry 1001, which, in turn processes the data to generate an AR overlay image in an electronic format that can be interpreted by projectors 1004a, 1004b. Eyewear circuitry 1001 then transmits the formatted AR overlay image to projectors 1004a, 1004b which, in turn, project the AR overlay image onto lenses 1003a, 1003b. Alternatively, eyewear circuitry 1001 can communicate data to an off board processor so that the off board processor performs some of the data processing, similarly to eyewear circuitry 201 and off board processor 300 of the embodiment depicted in FIG. 3.

Projectors 1004a, 1004b interact with the lenses 1003a, 1003b to create an augmented reality experience in a manner consistent with the embodiments described previously.

Figure 11:
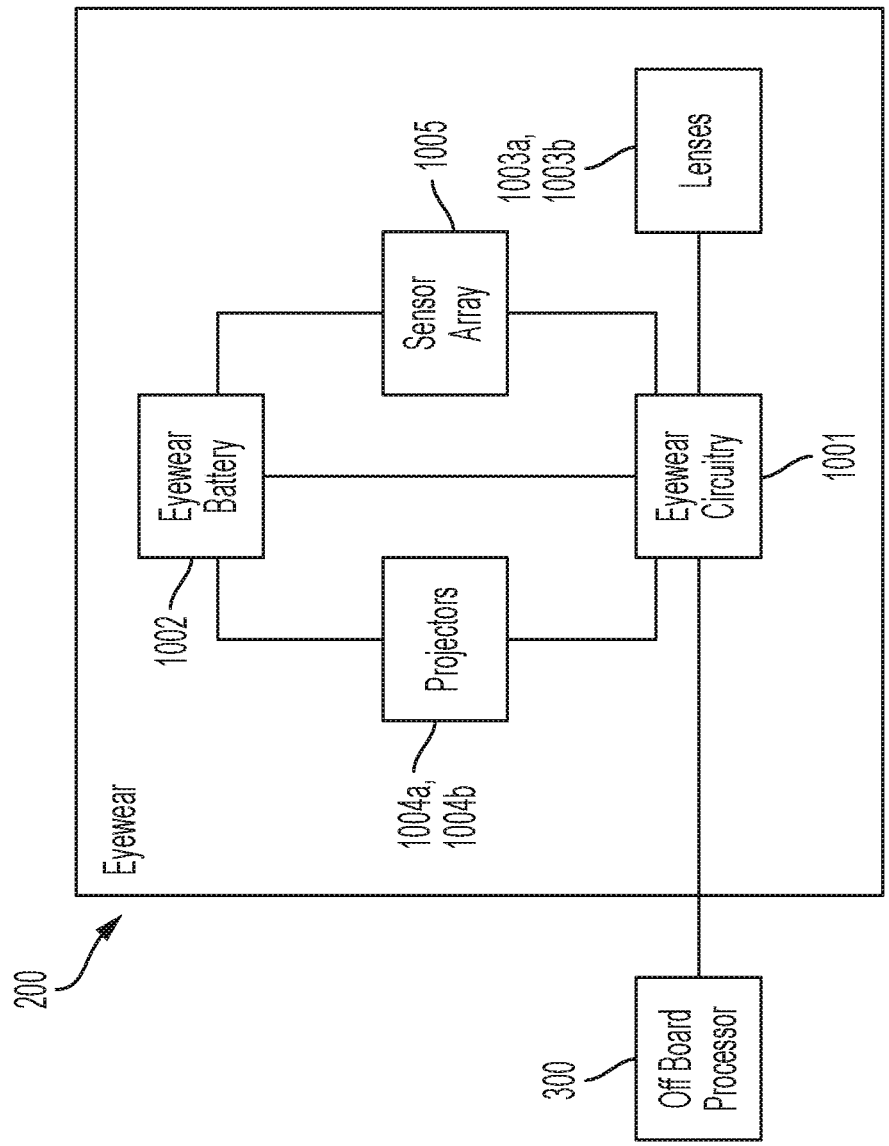
FIG. 11 is a block diagram that shows the electrical interfaces between various components of the eyewear of FIG. 10.

FIG. 11 is a block diagram that shows the electrical interfaces between various components of the eyewear of FIG. 10. The communication links between the components shown in FIG. 4 can be wired or wireless connections.

Figure 12:
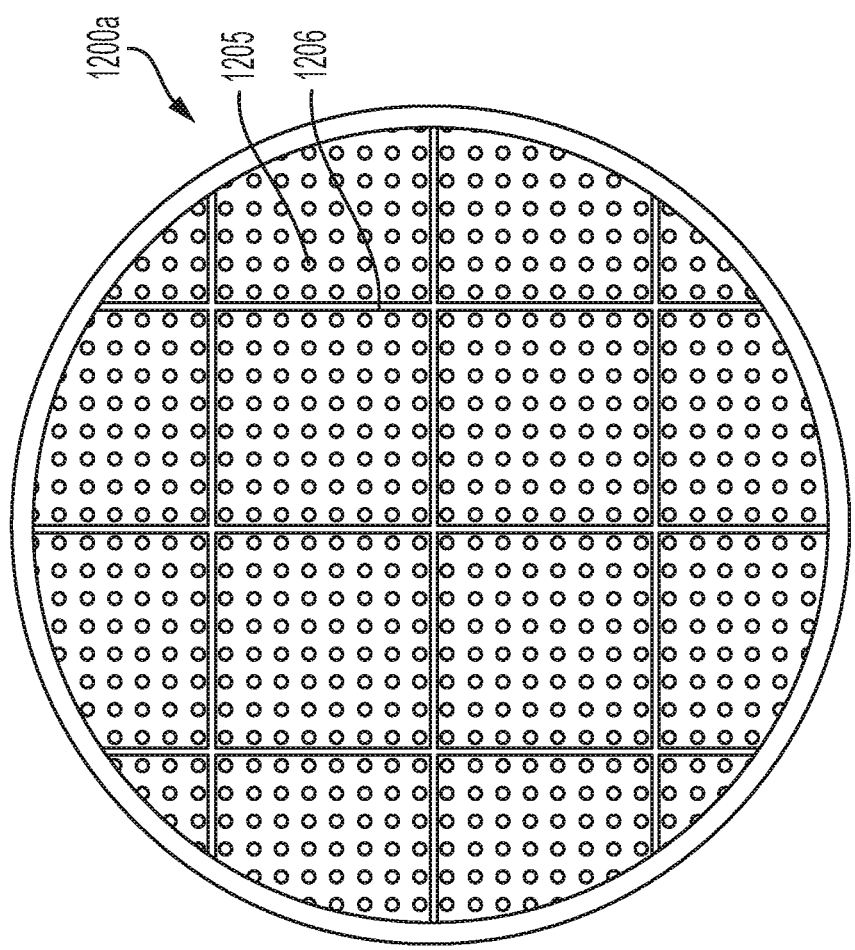
FIG. 12 is a zoomed-in portion of an off-state lens according to another embodiment of the invention.
Figure 13:
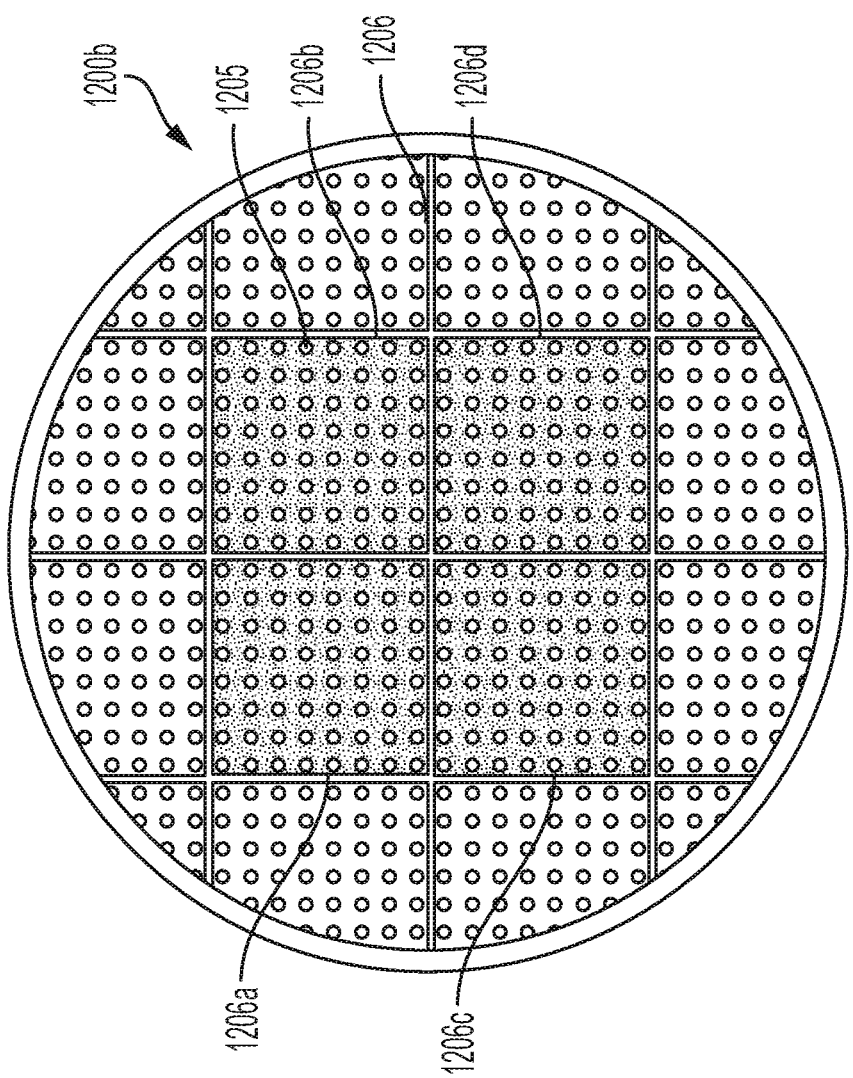
FIG. 13 is a zoomed-in portion of an on-state lens according to the embodiment depicted in FIG. 12.

FIG. 12 is a zoomed-in portion 1200a of off-state lens 203b (or, equivalently, lens 1003b) according to an alternative embodiment of the invention. FIG. 13 illustrates zoomed-in portion 1200b of on-state lens 203a (or, equivalently, lens 1003a), according to the same embodiment depicted in FIG. 12. Zoomed-in portions 1200a, 1200b highlight various aspects of conductive layers 502a of lenses 203a, 203b according to the present embodiment. First conductive layer 502a of the present embodiment includes first regions 1205 which can be configured similarly to, for example, first regions 205 from previous embodiments or, alternatively, multi-size first regions 801 from previous embodiments. In the depicted embodiment, first regions 1205 are configured similarly to first regions 205 from previous embodiments. First conductive layer 502a further includes a plurality of second regions 1206 which are electrically isolated from each other and from first regions 1205 such that eyewear circuitry 201 can apply voltages to each of the second regions 1206 individually. First conductive layer 502a with second regions 1206 can be created by applying conventional techniques, such as ultraviolet lithography or extreme ultraviolet lithography, to a transparent conducting material. Eyewear circuitry 201 can be electrically connected to second regions 1206 using conventional techniques (e.g., electrical connections similar to active matrix liquid crystal displays). The plurality of second regions 1206 are depicted in FIGS. 12 and 13 as square but can instead be other known shapes, such as hexagonal, triangular, rectangular, or octagonal. In the depicted embodiment, each second region 1206 houses 64 first regions 1205; however, in alternative embodiments, second regions 1206 can house additional or fewer first regions 1205.

One advantage of the present embodiment is that eyewear circuitry 201 can selectively apply a voltage to only second regions 1206 that house first regions 1205 receiving a portion of any given AR overlay, thereby permitting the remainder of the lens 203a, 203b to remain in the off-state and allow light to enter from the surrounding environment unimpeded by any liquid crystal activation. To create the desired augmented reality experience, the second regions 1206 that house first regions 1205 receiving a portion of the present AR overlay can be pulsed between, for example, an on-state and an off-state, or between an off-state, first on-state, second on-state, and third on-state, in accordance with the embodiments discussed previously.

For example, as shown in FIG. 13, eyewear circuitry 201 can rapidly pulse second regions 1206a-1206d and leave the remaining second regions 1206 in the off-state. The corresponding portion of zoomed-in portion 1200b is shaded to illustrate that a voltage is only applied across the shaded portion of the lens that includes second regions 1206a-1206d. First regions 1205 that are disposed between second regions 1206a-1206d can then receive the AR overlay when a voltage is applied across second regions 1206a-1206d to create the desired augmented reality experience. At the same time, all second regions 1206 other than second regions 1206a-1206d can remain in the off-state and can therefore advantageously permit light from the surrounding environment to pass unimpeded by any activation of liquid crystals.

Eyewear circuitry 201 can also be configured to rapidly pulse not only second regions 1206 that house first regions 1205 receiving a portion of the AR overlay, but also additional second regions 1206 surrounding the second regions 1206 that house first regions 1205 receiving a portion of the AR overlay. An advantage of this technique is that it reduces the user's exposure to the light perceived as immediately surrounding the AR overlay, which can improve contrast and the quality of the augmented reality experience to the user.

The second regions 1206 that are rapidly pulsed can be pulsed between each of the states at the same time. For example, in FIG. 13, each of the second regions 1206a-1206d can be pulsed to the on-state, and then the off-state, etc. However, the second regions 1206 that are rapidly pulsed between each of the states need not be in the same state simultaneously. For example, in FIG. 13, second regions 1206a-1206b can be in the on-state while second regions 1206c-1206d are in the off-state, and vice versa. This technique can advantageously reduce eye strain. In this configuration, circuitry 102 (or, in embodiments which do not utilize headwear, eyewear circuitry 1001) divides each AR overlay into a first AR overlay and a second AR overlay. Projectors 104a, 104b (or projectors 1004a, 1004b) sequentially project the first AR overlay and the second AR overlay. While the first AR overlay is being projected, a voltage is applied across only second regions 1206 that house first regions 1205 receiving a portion of the first AR overlay. Similarly, while the second AR overlay is being projected, a voltage is applied across only second regions 1206 that house first regions 1205 receiving a portion of the second AR overlay. In embodiments utilizing both headwear and eyewear, the circuitry 102 of the headwear and the eyewear circuitry 201 can communicate using conventional techniques to ensure that a voltage is applied to the appropriate second regions 1206.

Figure 14:
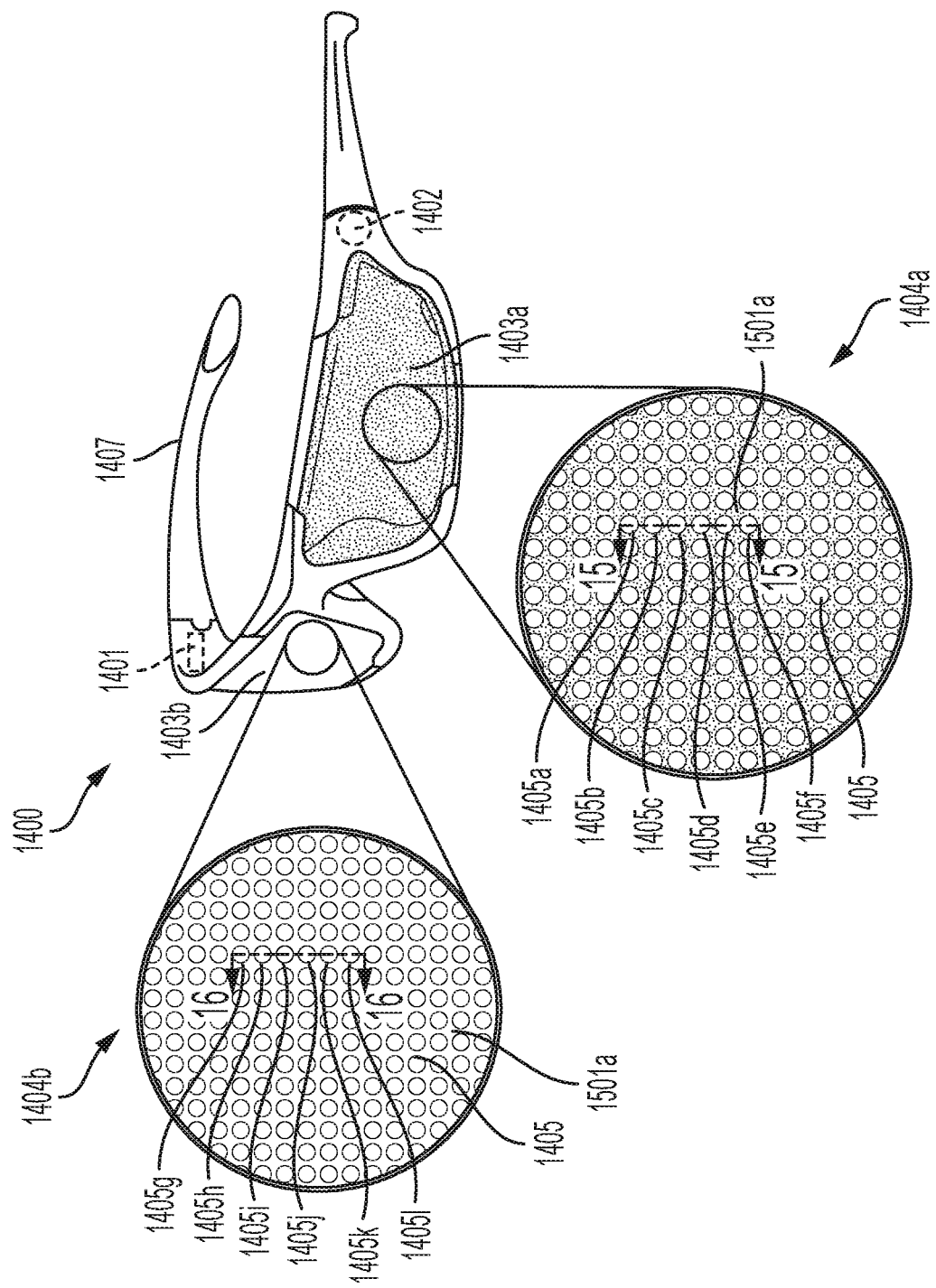
FIG. 14 is a perspective view of an embodiment of AR eyewear including lenses according to another embodiment of the invention, and further illustrates zoomed-in portions of the on-state and off-state lenses.

FIG. 14 is a perspective view of an embodiment of eyewear 1400 including lenses 1403a, 1403b according to another embodiment of the invention, and further illustrates zoomed-in portions 1404a, 1404b of lenses 1403a, 1403b, respectively. Eyewear 1400 further includes frame 1407, eyewear circuitry 1401, and eyewear battery 1402. In one embodiment, frame 1407, eyewear circuitry 1401, and eyewear battery 1402 can be configured, for example, similarly to the frame 207, eyewear circuitry 201, and eyewear battery 202 of the embodiment of FIG. 2. Eyewear 1400 can be configured to interact with headwear similarly to, for example, how eyewear 200 is configured to interact with headwear 100. Alternatively, frame 1407, eyewear circuitry 1401, and eyewear battery 1402 can be configured, for example, similarly to the frame 1007, eyewear circuitry 1001, and eyewear battery 1002 of the embodiment of FIG. 10. Eyewear 1400 can also include projectors and booms similarly to eyewear 1000 of FIG. 10, which removes the need for accompanying headwear.

Figure 15:
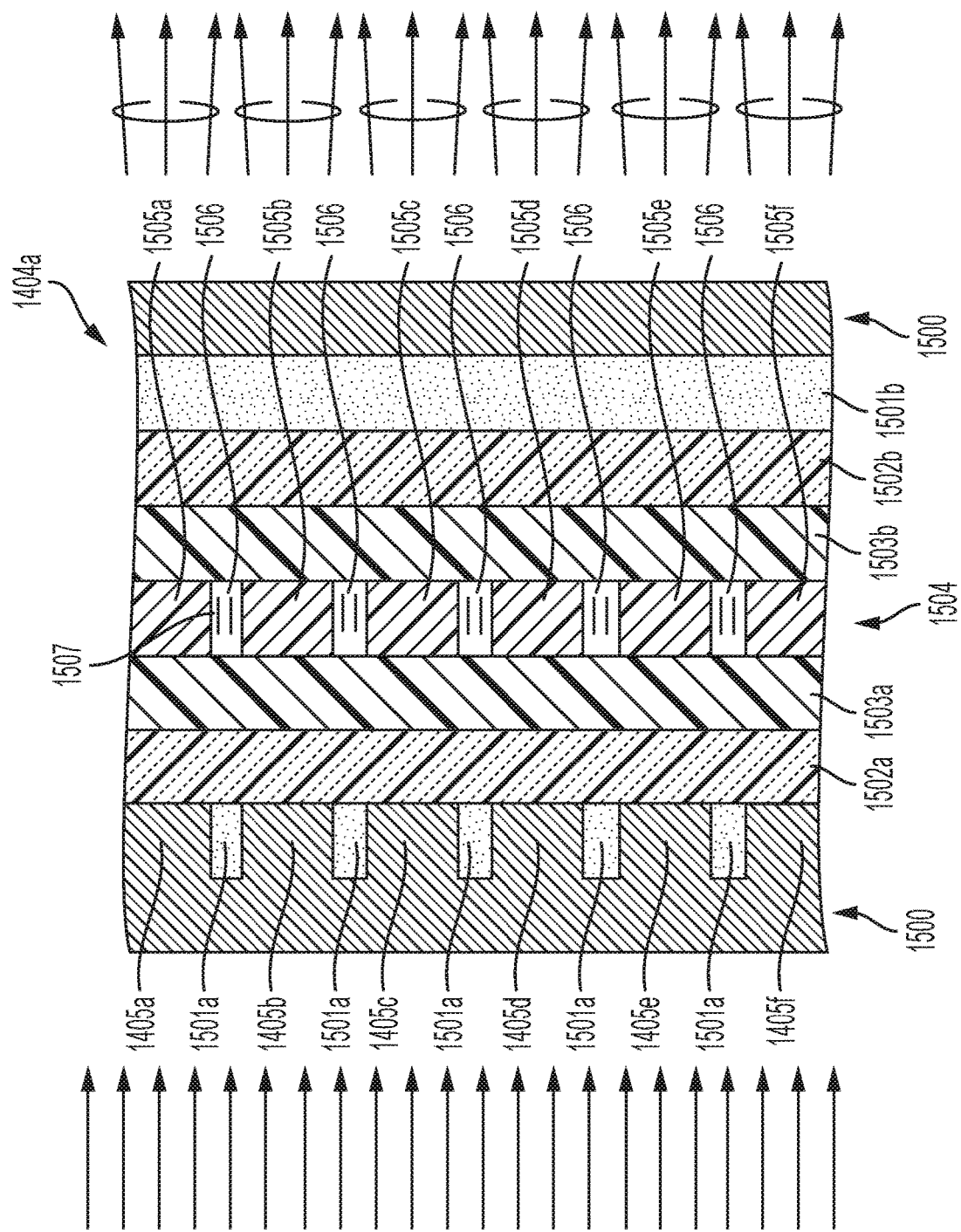
FIG. 15 is a partial cross-section view along line 15-15 of the zoomed-in portion of the on-state lens depicted in FIG. 14.
Figure 16:
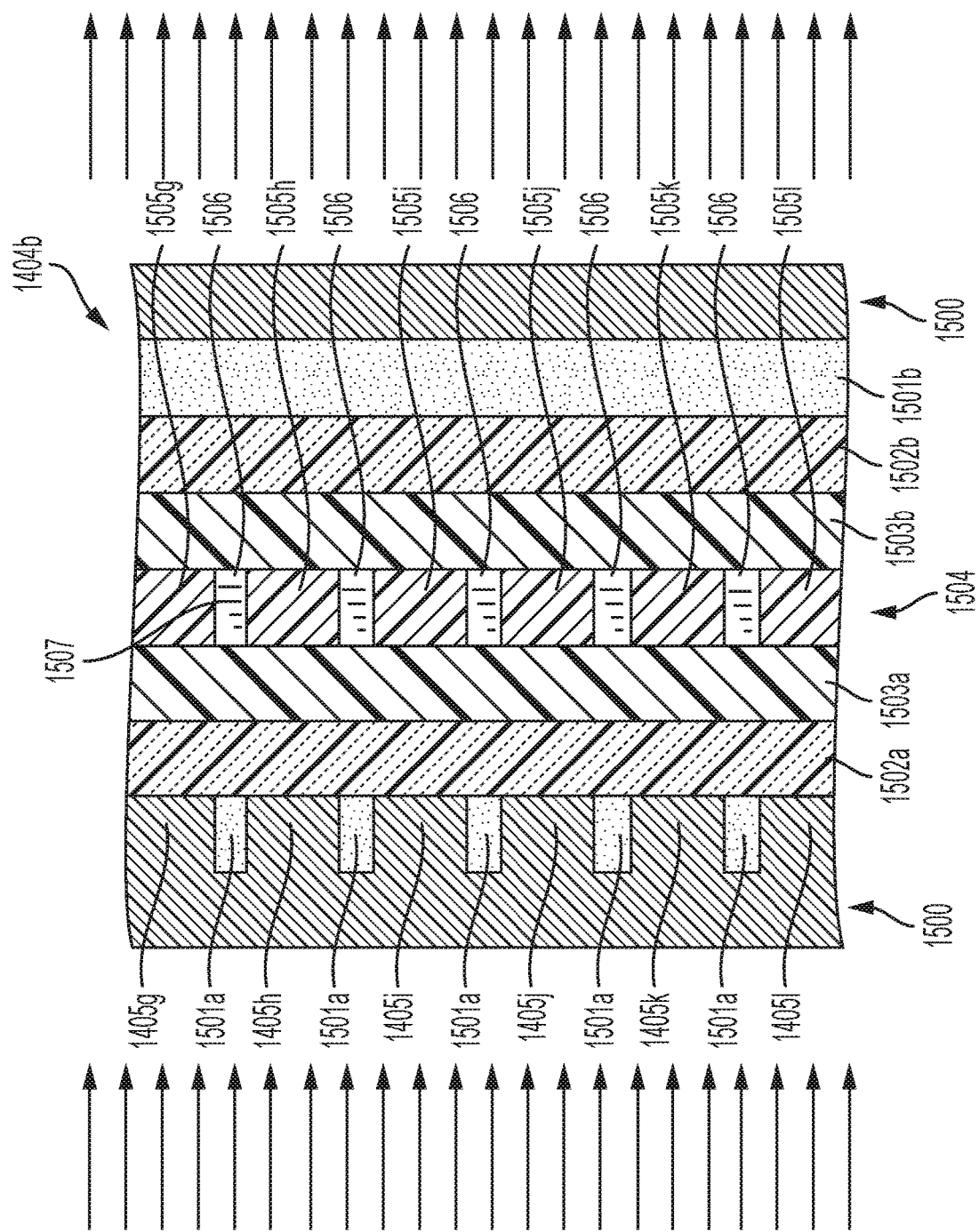
FIG. 16 is a partial cross-section view along line 16-16 of the zoomed-in portion of the off-state lens depicted in FIG. 14.

Lens 1403a is depicted in the on-state, and lens 1403b is depicted in the off-state. Lenses 1403a, 1403b include multiple layers. FIG. 15 is a partial cross-section view along line 15-15 of zoomed-in portion 1404a of on-state lens 1403a according to one embodiment of lens 1403a. FIG. 16 is a partial cross-section view along line 16-16 of the zoomed-in portion of an off-state lens 1403b according to the embodiment of FIG. 15. According to the embodiment shown in FIGS. 15 and 16, lenses 1403a, 1403b include filters 1501a, 1501b, conductive layers 1502a, 1502b, alignment layers 1503a, 1503b, liquid crystal layer 1504, and housing layer 1500, which are positioned in a manner largely consistent with conventional liquid crystal displays, as described in the previous embodiments.

One of the filters 1501a, 1501b can be conventional. In the depicted embodiment, second filter 1501b is a conventional filter. As shown in FIGS. 14-16, lenses 1403a, 1403b further include a plurality of protrusions 1405, which are not polarized. The partial cross-section view of FIG. 15 falls specifically along protrusions 1405a-1405f of protrusions 1405, and the partial cross-section view of FIG. 16 falls specifically along protrusions 1405g-1405l of protrusions

1405. In the depicted embodiment, housing 1500 and protrusions 1405 can be contiguous and made of, for example, transparent acrylic plastic. Alternatively, protrusions 1405 can be made of, for example, a transparent conducting material just like conductive layer 1502a, and protrusions 1405 and conductive layer 1502a can be contiguous.

First filter 1501a can be created by, for example, removing appropriate portions of a conventional polarizing filter using conventional techniques, such as ultraviolet lithography or laser etching, to create voids. Protrusions 1405 can be created after, for example, placing first filter 1501a onto the appropriate portion of housing 1500 by subsequently using conventional techniques to deposit a transparent acrylic plastic into the voids of first filter 1501a, which can result in housing 1500 and protrusions 1405 fusing together and becoming a single contiguous unit. Protrusions 1405 (and the voids of first filter 1501a) can be circular, approximately circular, hexagonal, octagonal, or other shapes (or combination of shapes) that can provide sufficient diffraction of visible light without generating unwanted image artifacts. Protrusions 1405 (and, consequently, voids of first filter 1501a) that are circular in shape can be advantageous because light passing through circular regions diffracts in a predictable manner.

First filter 1501a and second filter 1501b can be linearly polarized and aligned such that they are polarized substantially orthogonally with respect to each other. For example, in the depicted embodiment, first filter 1501a is horizontally polarized, which corresponds to being polarized into and out of the plane of the page depicted in FIGS. 15 and 16. Second filter 1501b is vertically polarized, which corresponds to being polarized vertically along the page depicted in FIGS. 15 and 16. These polarities are illustrative, and first filter 1501a and second filter 1501b could also be positioned differently so long as their polarities are substantially orthogonal with respect to each other.

Conductive layers 1502a, 1502b are respectively positioned proximate substantially orthogonally polarized filters 1501a, 1501b. In this embodiment, both conductive layers 1502a, 1502b can be conventional. First alignment layer 1503a and second alignment layer 1503b are respectively positioned proximate first conductive layer 1502a and second conductive layer 1502b. As is conventional for liquid crystal displays, first alignment layer 1503a and second alignment layer 1503b are preferably etched linearly and aligned such that they are etched substantially orthogonally to each other, and such that the etchings of first alignment layer 1503a are parallel to the polarity of first filter 1501a and the etchings of second alignment layer 1503b are parallel to the polarity of second filter 1501b. For example, in the depicted embodiment, first alignment layer 1503a is etched horizontally, and second alignment layer 1503b is etched vertically.

Liquid crystal layer 1504, which is positioned in a conventional manner between alignment layers 1503a, 1503b, includes region with liquid crystals 1506 and a plurality of regions without liquid crystals 1505. Region with liquid crystals 1506 includes conventional liquid crystals 1507. Regions without liquid crystals 1505 do not include liquid crystals. Liquid crystal layer 1504 can be created by applying conventional techniques, such as such as ultraviolet lithography or extreme ultraviolet lithography, to a material which allows visible light to pass through, such as transparent acrylic plastic. The partial cross-section view of FIG. 15 falls specifically along regions without liquid crystals 1505a-1505f of regions without liquid crystals 1505, and the partial cross-section view of FIG. 16 falls specifically along regions without liquid crystals 1505g-15051 of regions without liquid crystals 1505.

Protrusions 1405 and regions without liquid crystals 1505 are approximately equal in size in at least the Y-Z plane, where the Y direction corresponds to the direction vertically along the page depicted in FIGS. 15-16, and the Z direction corresponds to the direction into and out of the plane of the page depicted in FIGS. 15-16. Each protrusion of protrusions 1405 is approximately concentrically aligned with one of the regions without liquid crystals 1505 of liquid crystal layer 1504—that is, each protrusion of protrusions 1405 is approximately aligned in the Y-Z plane with one of the regions without liquid crystals 1505 of liquid crystal layer 1504. For example, protrusion 1405a is approximately concentrically aligned with region without liquid crystals 1505a.

As the result of the configuration of alignment layers 1503a, 1503b with region with liquid crystals 1506 of liquid crystal layer 1504, when no voltage is applied across conductive layers 1502a, 1502b, liquid crystals 1507 are in a 90-degree twisted helix configuration such that horizontally polarized light which passes through the horizontally polarized first filter 1501a will twist 90 degrees when passing through region with liquid crystals 1506 and will accordingly be able to pass through the vertically polarized second filter 1501b. Housing layer 1500 can be made from, for example, glass or plastic, and be used to house filters 1501a, 1501b, conductive layers 1502a, 1502b, alignment layers 1503a, 1503b, and liquid crystal layer 1504.

Eyewear circuitry 1401 is electrically connected to conductive layers 1502a, 1502b using conventional techniques and can selectively apply a voltage across conductive layers 1502a, 1502b to activate the liquid crystals 1507 in liquid crystal layer 1504. A lens 1403a, 1403b is in the on-state when a voltage is applied across conductive layers 1502a, 1502b, respectively. In operation, the applied voltage will create an electric field between conductive layers 1502a, 1502b, which will cause liquid crystals 1507 to align in the direction of the electric field, thereby losing their ability to act as a waveguide that shifts the polarization of incident light by 90 degrees. As a result, horizontally polarized light passing through first filter 1501a will not twist while passing liquid crystal layer 1504 and accordingly will not pass through second filter 1501b.

More specifically, incoming light will first pass through housing layer 1500, and then light of the requisite polarity will pass through first filter 1501a. The light will next pass through first conductive layer 1502a and first alignment layer 1503a. The light will then pass through region with liquid crystals 1506 where its polarity will not be twisted due to the electric field aligning liquid crystals 1507. The light will then pass through second alignment layer 1503b and second conductive layer 1502b, but the light will not pass through second filter 1501b because the polarity of the light is substantially orthogonal to the polarity of second filter 1501b. As a result, the light will not reach a user's eye.

Turning now to protrusions 1405, even when lens 1403a, 1403b is in the on-state, light passing through protrusions 1405 will pass through the corresponding portions of second filter 1501b and housing layer 1500, and then, to a user's eye. More particularly, incoming light will first pass through housing layer 1500, protrusions 1405, first conductive layer 1502a, first alignment layer 1503a, one of the regions without liquid crystals 1505, second alignment layer 1503b, and second conductive layer 1502b. Light of the requisite polarity will pass through second filter 1501b. The light will finally pass through housing layer 1500 and will ultimately reach the user's eye. Though light can pass through protrusions 1405 in the manner described above, to diffract the light exiting an on-state lens, protrusions 1405 and regions without liquid crystals 1505 are sized similarly to first regions 205 from previous embodiments.

Turning now to FIG. 16, a lens 1403a, 1403b is in the off-state when no voltage is applied across conductive layers 1502a, 1502b. Light can pass through lens 1403a, 1403b in the off-state, regardless of whether the light passes through protrusions 1405 or first filter 1501a. Light of any polarity passing through protrusions 1405 will further pass through first conductive layer 1502a, first alignment layer 1503a, the respective region without liquid crystals 1505, second alignment layer 1503b, and second conductive layer 1502b. Then light of the requisite polarity will pass through second filter 1501b. Finally, the light will pass through housing layer 1500 and ultimately reach the user's eye.

Light passing through first filter 1501a in the off-state will also reach the user's eye. More specifically, light of the requisite polarity passing through first filter 1501a will further pass through first conductive layer 1502a and first alignment layer 1503a. The light will then pass through region with liquid crystals 1506, where its polarity will be twisted by 90 degrees to the same direction as second filter 1501b. The light will then pass through second alignment layer 1503b, second conductive layer 1502b, second filter 1501b, and housing layer 1500 and will ultimately reach the user's eye.

Figure 17:
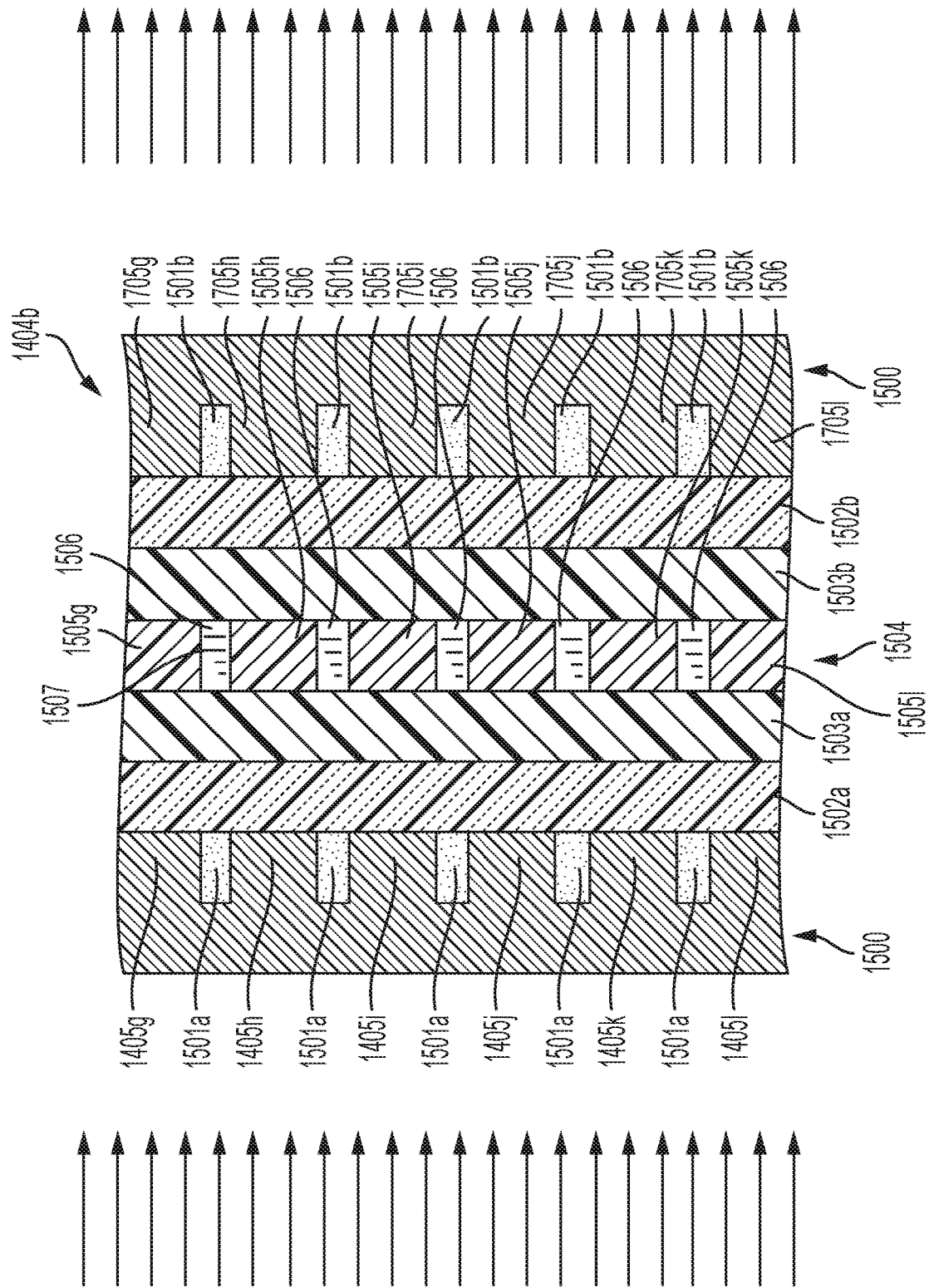
FIG. 17 is a partial cross-section view along line 16-16 of the zoomed-in portion of an off-state lens according to an alternative embodiment of the lenses of FIG. 14.

FIG. 17 is a partial cross-section view along line 16-16 of zoomed-in portion of off-state lens 1403b according to an alternative embodiment of lenses 1403a, 1403b of FIG. 14. The embodiment depicted in FIG. 17 can be the same as the embodiment depicted in FIGS. 15 and 16, except in the embodiment of FIG. 17, the right portion of housing 1500 includes protrusions 1705, and second filter 1501b is configured with voids similarly to first filter 1501a. Protrusions 1705 are similar to protrusions 1405. Protrusions 1705 fill the voids of second filter 1501b similar to how protrusions 1405 fill the voids of first filter 1501a. The partial cross-section view of FIG. 17 falls specifically along protrusions 1705g-17051 of second filter 1501b.

Protrusions 1405 and protrusions 1705 are approximately equal in size in at least the Y-Z plane, where the Y direction corresponds to the direction vertically along the page depicted in FIG. 17, and the Z direction corresponds to the direction into and out of the plane of the page depicted in FIG. 17. Each protrusion of protrusions 1405 is approximately concentrically aligned with both one of the protrusions 1705 of second filter 1501b and one of the regions without liquid crystals 1505—that is, each protrusion of protrusions 1405 is approximately aligned in the Y-Z plane with both one of the protrusions 1705 of second filter 1501b and one of the regions without liquid crystals 1505. For example, protrusion 1705g is approximately concentrically aligned with both region without liquid crystals 1505g and protrusion 1405g of first filter 1501a. One potential advantage of this embodiment is that light passing through a protrusion of protrusions 1405 and a protrusion 1705 will not be partially blocked from reaching the user's eye by any polarizing filter.

First filter 1501a and second filter 1501b can be linearly polarized and aligned such that they are polarized substantially orthogonally with respect to each other. For example, in the depicted embodiment, first filter 1501a is horizontally polarized, which corresponds to being polarized into and out of the plane of the page depicted in FIG. 17. Second filter 1501b is vertically polarized, which corresponds to being polarized vertically along the page depicted in FIG. 17. These polarities are illustrative, and first filter 1501a and second filter 1501b could also be positioned differently so long as their polarities are substantially orthogonal with respect to each other.

The lenses 1403a, 1403b can be rapidly pulsed between, for example, an on-state and an off-state and synchronized with projectors to create an augmented reality experience according to the embodiments described previously.

Figure 18:
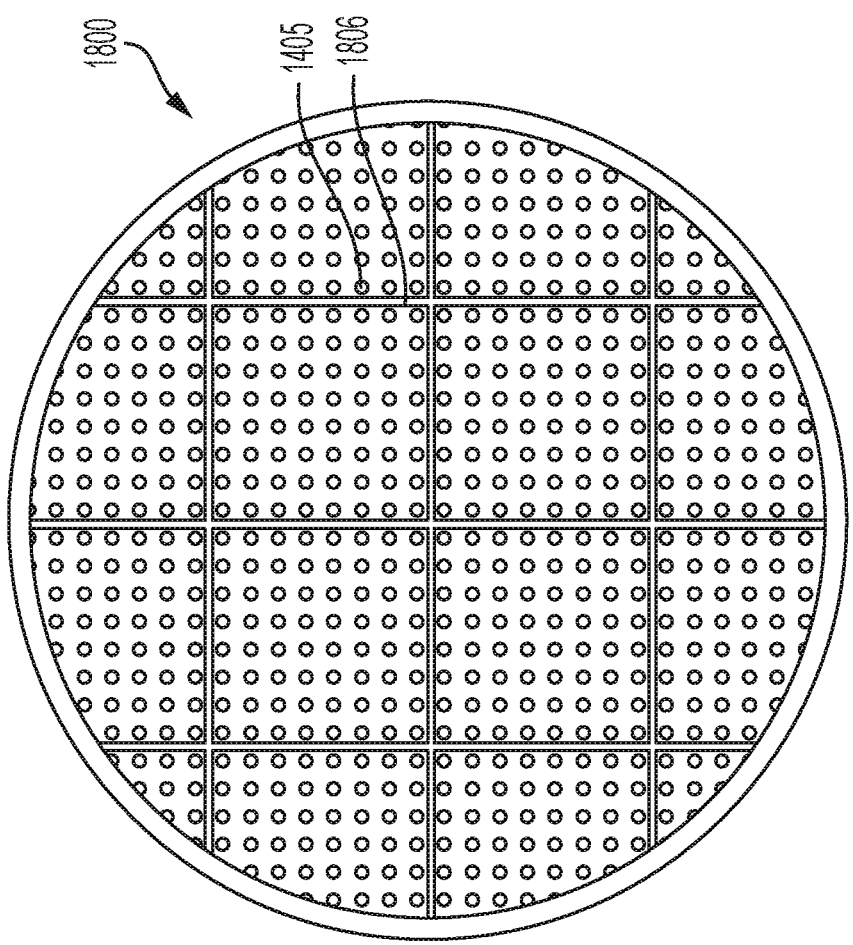
FIG. 18 is a zoomed-in portion of an off-state lens according to an alternative embodiment of the invention.

FIG. 18 is a zoomed-in portion 1800 of an off-state lens according to an alternative embodiment of the invention. The lens depicted by zoomed-in portion 1800 can be configured exactly the same as, for example, lenses 1403a, 1403b as shown in FIGS. 14-16, or the same as lens 1403b as shown in FIG. 17, except in the embodiment in FIG. 18, one of the conductive layers, for example first conductive layer 1502a, includes a plurality of second regions 1806 that are electrically isolated from each other such that eyewear circuitry 1401 can apply voltages to each of the electrically isolated second regions 1806 individually. FIG. 18 highlights features of multiple layers of zoomed in-portion 1800. More specifically, FIG. 18 depicts protrusions 1405 of, for example, housing 1500, and second regions 1806 of first conductive layer 1502a. Similarly to the embodiment presented in FIGS. 12 and 13, one advantage of the present embodiment is that eyewear circuitry 1401 can selectively apply a voltage across only second regions 1806 that receive a portion of the AR overlay, and optionally some of those section regions 1806 surrounding second regions 1806 that receive a portion of the AR overlay.

The invention claimed is:
1. An augmented reality system, comprising:
a headwear;
an eyewear frame;
a power source attached to the headwear;
a sensor array attached to the headwear and comprising one or more sensors;
a lens attached to the eyewear frame and comprising a user side, an opposing side, a first conductive layer, a second conductive layer, and a liquid crystal layer disposed between the first and second conductive layers;
a projector attached to the headwear projecting to the opposing side of the lens;
a first circuit attached to the headwear and powered by the power source and capable of communicating with the sensor array and the projector;
a second circuit attached to the eyewear frame, wherein:
the first circuit can receive and process data collected by the sensor array to produce an augmented reality overlay;
the lens can be configured to be in a first state wherein light is prevented from passing through a first portion of the lens;
in the first state, the projector can project at least a first portion of the augmented reality overlay onto at least a second portion of the lens;
the lens can be configured to be in a second state wherein light is not prevented from passing through the first portion of the lens; and
the second circuit can control the lens to be in the first state or the second state.
2. The augmented reality system according to claim 1 further comprising:
an off board computing device, wherein the first circuit and the off board computing device use data collected by the sensor array to generate at least a second portion of the augmented reality overlay.

3. The augmented reality system according to claim 1, wherein:
the liquid crystal layer comprises liquid crystals;
the first conductive layer comprises a plurality of first regions and a second region electrically isolated from the plurality of first regions; and
when the lens is in the first state, the liquid crystals disposed between the second region and the second conductive layer are aligned.

4. The augmented reality system according to claim 1, wherein:
the liquid crystal layer comprises liquid crystals;
the first conductive layer comprises a plurality of first regions and a plurality of second regions;
the plurality of second regions are electrically isolated from each other and from the plurality of first regions; and
when the lens is in the first state, the liquid crystals disposed between at least one of the plurality of second regions and the second conductive layer are aligned.

5. The augmented reality system according to claim 4, wherein a third region contains the second regions that are at least partially illuminated by the augmented reality overlay when the lens is in the first state, and wherein when the lens is in the first state, the liquid crystals disposed between the third region and the second conductive layer are aligned.

6. The augmented reality system according to claim 5, wherein a fourth region contains at least one second region adjacent to the third region, and wherein when the lens is in the first state, the liquid crystals disposed between the fourth region and the second conductive layer are aligned.

7. The augmented reality system according to claim 4, wherein:
the augmented reality overlay can be divided into a first augmented reality overlay portion and a second augmented reality overlay portion;
in the first state, the projector is configured to project the first augmented reality overlay portion onto the lens;
in the second state, the projector is configured to project the second augmented reality overlay portion onto the lens;
a third region contains the second regions that are at least partially illuminated by the first augmented reality overlay portion when the lens is in the first state;
a fourth region contains the second regions that are at least partially illuminated by the second augmented reality overlay portion when the lens is in the second state; in the first state;
the liquid crystals disposed between the second conductive layer and the third region are aligned; and
in the second state, the liquid crystals disposed between the second conductive layer and the fourth region are aligned.

8. The augmented reality system according to claim 1, wherein:
the liquid crystal layer comprises liquid crystals;
the first conductive layer comprises a plurality of multi-size first regions and a second region electrically isolated from the plurality of first regions.

9. The augmented reality system according to claim 8, wherein each of the multi-size first regions further includes a first zone, a second zone, and a third zone, each of which are electrically isolated from each other.

10. The augmented reality system according to claim 9, wherein:
the lens is further controllable to a third state;
in the first state, the liquid crystals disposed between the second conductive layer on one end and one of the second zones, one of the third zones, or the second region on the other end are aligned;
in the second state, the liquid crystals disposed between the second conductive layer on one end and one of the third zones or the second region on the other end are aligned; and
in the third state, the liquid crystals disposed between the second conductive layer on one end and the second region on the other end are aligned.

11. The augmented reality system according to claim 10, wherein blue light passing through the lens in the first state, green light passing through the lens in the second state, and red light passing through the lens in the third state all diffract approximately the same amount.

* * * * *